US012639650B2

(12) United States Patent
Webb et al.

(10) Patent No.:  US 12,639,650 B2
(45) Date of Patent:      May 26, 2026

(54) METHOD AND SYSTEM TO USE REAL-TIME ACTIVITY TO PROVIDE WORKFORCE MONITORING

(71) Applicant: CodeTogether, Inc., Wilmington, DE (US)

(72) Inventors: Timothy Richard Webb, Dallas, TX (US); Wojciech Galanciak, Poznan (PL)

(73) Assignee: CodeTogether, Inc., Wilmington, DE (US)

( * ) Notice: Subject to any disclaimer, the term of this patent is extended or adjusted under 35 U.S.C. 154(b) by 0 days.

(21) Appl. No.: 18/401,283

(22) Filed: Dec. 29, 2023

(65) Prior Publication Data

US 2024/0220899 A1     Jul. 4, 2024

Related U.S. Application Data

(60) Provisional application No. 63/436,398, filed on Dec. 30, 2022.

(51) Int. Cl.
*G06Q 10/0633*       (2023.01)
*G06Q 10/0631*       (2023.01)
(Continued)

(52) U.S. Cl.
CPC ...  *G06Q 10/0633* (2013.01); *G06Q 10/06313* (2013.01); *G06Q 10/0635* (2013.01); *G06Q 10/0639* (2013.01)

(58) Field of Classification Search
None
See application file for complete search history.

(56) References Cited

U.S. PATENT DOCUMENTS 6,519,763 B1     2/2003  Kaufer
6,785,592 B1     8/2004  Smith
(Continued)

FOREIGN PATENT DOCUMENTS

CN       109901820 A      6/2019
CN       113742248        12/2021
(Continued)

OTHER PUBLICATIONS

Biffl, Stefan, Wikan Danar Sunindyo, and Thomas Moser. "A Project Monitoring Cockpit Based On Integrating Data Sources in Open Source Software Development." SEKE. 2010 (Year: 2010).*
(Continued)

*Primary Examiner* — Darlene Garcia-Guerra
(74) *Attorney, Agent, or Firm* — Goodwin Procter LLP

(57)           ABSTRACT

A method for predicting progress of a code development project, comprising: monitoring behavior of a plurality of software developers through interaction with at least an integrated development environment; providing a predictive model of the code development project adapted to predict a future status of the code development project; and outputting a prediction dependent on a status of the code development project at a future time, the interaction comprising: exploration events comprising browsing source code for understanding or investigation; coding events comprising actively modifying source code; debugging events comprising interacting with a debugger stepping through code in a debugging phase; and testing events comprising coding or running unit tests and test automation.

19 Claims, 17 Drawing Sheets

(51) Int. Cl.
   *G06Q 10/0635*      (2023.01)
   *G06Q 10/0639*      (2023.01)

(56)                     References Cited

U.S. PATENT DOCUMENTS

| | | |
|---|---|---|
| 6,996,517 B1 | 2/2006 | Papaefstathiou |
| 7,974,849 B1 | 7/2011 | Begole |
| 9,135,559 B1 | 9/2015 | Chan |
| 9,141,921 B2 | 9/2015 | Dunne |
| 9,251,484 B2 * | 2/2016 | Cantor ........... G06Q 10/063114 |
| 9,727,736 B1 * | 8/2017 | McClintock ........ G06F 11/3604 |
| 9,785,411 B2 | 10/2017 | Dunne |
| 9,785,715 B1 | 10/2017 | Busey |
| 10,001,975 B2 | 6/2018 | Bharthulwar |
| 10,061,578 B2 | 8/2018 | Walsh |
| 10,083,027 B2 | 9/2018 | Moorthi |
| 10,248,387 B2 | 4/2019 | Bharthulwar |
| 10,359,997 B2 | 7/2019 | Dunne |
| 10,511,690 B1 | 12/2019 | Chatterjee |
| 10,684,910 B2 | 6/2020 | Chau |
| 10,729,502 B1 | 8/2020 | Wolf |
| 10,732,935 B2 | 8/2020 | Ganninger |
| 10,839,033 B1 | 11/2020 | Fabbrizio |
| 10,853,826 B2 | 12/2020 | Romagnolo |
| 10,938,828 B1 | 3/2021 | Badawy |
| 11,004,022 B1 | 5/2021 | Ghalaty et al. |
| 11,009,836 B2 | 5/2021 | Hoffmann |
| 11,074,105 B2 | 7/2021 | Walby |
| 11,128,589 B1 | 9/2021 | Evans |
| 11,128,636 B1 | 9/2021 | Jorasch |
| 11,165,643 B1 | 11/2021 | Blackburn |
| 11,181,872 B1 | 11/2021 | Herring, III |
| 11,347,629 B2 | 5/2022 | Sharma |
| 11,348,679 B1 | 5/2022 | Perry |
| 11,366,842 B1 | 6/2022 | Swaminathan |
| 11,372,640 B1 * | 6/2022 | Bakardzhiev ............. G06F 8/71 |
| 11,403,000 B1 | 8/2022 | Barker, Jr. |
| 11,416,298 B1 | 8/2022 | Barker, Jr. |
| 11,436,001 B2 | 9/2022 | Masis |
| 11,438,289 B2 | 9/2022 | Evans |
| 11,550,643 B1 | 1/2023 | Enck |
| 11,550,758 B2 | 1/2023 | Maddila |
| 11,797,102 B2 | 10/2023 | Jorasch |
| 11,798,092 B2 | 10/2023 | Wolf |
| 11,798,431 B2 | 10/2023 | Gupta |
| 11,803,358 B1 | 10/2023 | Gupta |
| 11,804,039 B2 | 10/2023 | Jorasch |
| 11,816,505 B2 | 11/2023 | Sandstrom |
| 11,829,953 B1 | 11/2023 | Cohen |
| 2002/0087717 A1 | 7/2002 | Artzi |
| 2002/0194601 A1 | 12/2002 | Perkes |
| 2003/0110503 A1 | 6/2003 | Perkes |
| 2004/0215599 A1 | 10/2004 | Apps |
| 2007/0008887 A1 | 1/2007 | Gorbatov |
| 2008/0091471 A1 | 4/2008 | Michon |
| 2008/0201705 A1 | 8/2008 | Wookey |
| 2008/0313595 A1 * | 12/2008 | Boulineau ........ G06Q 10/06313 |
| | | 717/101 |
| 2009/0271337 A1 | 10/2009 | Vazacopoulos |
| 2009/0299767 A1 | 12/2009 | Michon |
| 2010/0011243 A1 | 1/2010 | Locasto |
| 2010/0223385 A1 | 9/2010 | Gulley |
| 2010/0305994 A1 | 12/2010 | Gaskell |
| 2011/0066486 A1 | 3/2011 | Bassin |
| 2011/0295722 A1 | 12/2011 | Reisman |
| 2012/0016701 A1 * | 1/2012 | Narendra ............... G06Q 10/06 |
| | | 705/7.11 |
| 2013/0013121 A1 | 1/2013 | Henze |
| 2013/0066789 A1 | 3/2013 | Gaskell |
| 2013/0110423 A1 | 5/2013 | Zimmermann |
| 2013/0144647 A1 * | 6/2013 | Ellingson ............... G16H 40/63 |
| | | 705/2 |
| 2013/0311968 A1 * | 11/2013 | Sharma ............... G06F 11/3692 |
| | | 717/101 |
| 2014/0222497 A1 | 8/2014 | Cantor et al. |
| 2015/0167085 A1 | 6/2015 | Salomon |
| 2015/0205954 A1 | 7/2015 | Jou |
| 2015/0301804 A1 | 10/2015 | Dunne |
| 2016/0049094 A1 | 2/2016 | Gupta |
| 2016/0100322 A1 | 4/2016 | Ekambaram |
| 2016/0110505 A1 | 4/2016 | Symanski |
| 2016/0188880 A1 | 6/2016 | Smith |
| 2016/0199215 A1 | 7/2016 | Kopelman |
| 2016/0239649 A1 | 8/2016 | Zhao |
| 2016/0307133 A1 | 10/2016 | Kour |
| 2017/0053242 A1 | 2/2017 | Ayyaswami |
| 2017/0075790 A1 | 3/2017 | MacLeod |
| 2017/0083290 A1 | 3/2017 | Bharthulwar |
| 2017/0124487 A1 | 5/2017 | Szeto |
| 2017/0137885 A1 | 5/2017 | Salomon |
| 2017/0206064 A1 | 7/2017 | Breazeal |
| 2017/0228684 A1 | 8/2017 | Perry |
| 2017/0232300 A1 | 8/2017 | Tran |
| 2017/0236081 A1 | 8/2017 | Grady Smith |
| 2017/0251985 A1 | 9/2017 | Howard |
| 2017/0255964 A1 | 9/2017 | Hendricks |
| 2017/0300966 A1 | 10/2017 | Dereszynski |
| 2017/0308800 A1 | 10/2017 | Cichon |
| 2018/0001184 A1 | 1/2018 | Tran |
| 2018/0053401 A1 | 2/2018 | Martin |
| 2018/0078843 A1 | 3/2018 | Tran |
| 2018/0096028 A1 | 4/2018 | Masekera |
| 2018/0129941 A1 | 5/2018 | Gustafson |
| 2018/0129959 A1 | 5/2018 | Gustafson |
| 2018/0137424 A1 | 5/2018 | Gabaldon Royval |
| 2018/0210709 A1 | 7/2018 | Bharthulwar |
| 2018/0243656 A1 | 8/2018 | Aghdaie |
| 2019/0026663 A1 * | 1/2019 | Homeyer ........... G06Q 10/0633 |
| 2019/0042290 A1 | 2/2019 | Bailey |
| 2019/0102244 A1 | 4/2019 | Tarlano |
| 2019/0110753 A1 | 4/2019 | Zhang |
| 2019/0113520 A1 | 4/2019 | Blume |
| 2019/0114167 A1 | 4/2019 | Biddle et al. |
| 2019/0196795 A1 | 6/2019 | Cavalier |
| 2019/0253328 A1 | 8/2019 | Kolar |
| 2019/0253861 A1 | 8/2019 | Horelik |
| 2019/0347093 A1 * | 11/2019 | Challagolla ......... G06F 11/3616 |
| 2019/0349619 A1 | 11/2019 | Hou |
| 2019/0361697 A1 | 11/2019 | Hu |
| 2019/0377816 A1 | 12/2019 | McCluskey |
| 2019/0377817 A1 | 12/2019 | McCluskey |
| 2020/0004604 A1 | 1/2020 | Lavoie |
| 2020/0005166 A1 | 1/2020 | Reich |
| 2020/0005212 A1 | 1/2020 | Stevens |
| 2020/0005219 A1 * | 1/2020 | Stevens ..................... G06F 8/71 |
| 2020/0045898 A1 | 2/2020 | Arriaza |
| 2020/0050448 A1 | 2/2020 | Gupta |
| 2020/0059776 A1 | 2/2020 | Martin |
| 2020/0067789 A1 | 2/2020 | Khuti |
| 2020/0084280 A1 | 3/2020 | Malhotra |
| 2020/0099688 A1 | 3/2020 | Anders |
| 2020/0105134 A1 | 4/2020 | Pietrobon |
| 2020/0106269 A1 | 4/2020 | Hannon |
| 2020/0126174 A1 | 4/2020 | Halse |
| 2020/0134485 A1 | 4/2020 | Sood |
| 2020/0210439 A1 | 7/2020 | Bar-On |
| 2020/0225945 A1 * | 7/2020 | Wright ............. G06Q 10/06315 |
| 2020/0237452 A1 | 7/2020 | Wolf |
| 2020/0250747 A1 | 8/2020 | Padmanabhan |
| 2020/0251213 A1 | 8/2020 | Tran |
| 2020/0252205 A1 | 8/2020 | Padmanabhan |
| 2020/0273581 A1 | 8/2020 | Wolf |
| 2020/0274962 A1 | 8/2020 | Martin |
| 2020/0279020 A1 | 9/2020 | Bar-On |
| 2020/0306632 A1 | 10/2020 | Kolen |
| 2020/0319877 A1 | 10/2020 | Glazer |
| 2020/0321076 A1 | 10/2020 | Putnam |
| 2020/0349271 A1 | 11/2020 | Binkley |
| 2020/0364245 A1 | 11/2020 | Sinha |
| 2020/0380417 A1 | 12/2020 | Briancon |
| 2020/0410997 A1 | 12/2020 | Bar-On |
| 2020/0410998 A1 | 12/2020 | Bar-On |
| 2020/0411199 A1 | 12/2020 | Shrager |
| 2021/0056209 A1 | 2/2021 | Fox |

(56) References Cited

U.S. PATENT DOCUMENTS

| | | |
|---|---|---|
| 2021/0060404 A1 | 3/2021 | Wanke |
| 2021/0063410 A1 | 3/2021 | Wilcox |
| 2021/0073449 A1 | 3/2021 | Segev |
| 2021/0082044 A1 | 3/2021 | Sliwka |
| 2021/0097883 A1 | 4/2021 | Scott |
| 2021/0142177 A1 | 5/2021 | Mallya |
| 2021/0142222 A1 | 5/2021 | Chang |
| 2021/0142249 A1 | 5/2021 | Ellsworth |
| 2021/0182414 A1 | 6/2021 | Sharma |
| 2021/0182993 A1 | 6/2021 | Arian |
| 2021/0203521 A1 | 7/2021 | Konda |
| 2021/0247403 A1 | 8/2021 | Arvey |
| 2021/0304105 A1 | 9/2021 | Honrao |
| 2021/0313051 A1 | 10/2021 | Asselmann |
| 2021/0313052 A1 | 10/2021 | Makrinich |
| 2021/0319408 A1 | 10/2021 | Jorasch |
| 2021/0342020 A1 | 11/2021 | Jorasch |
| 2021/0342146 A1 | 11/2021 | Ignatev |
| 2021/0342361 A1 | 11/2021 | Radzewsky |
| 2021/0342785 A1 | 11/2021 | Mann |
| 2021/0342836 A1 | 11/2021 | Cella |
| 2021/0350254 A1 | 11/2021 | Furlanetto |
| 2021/0373676 A1 | 12/2021 | Jorasch |
| 2021/0374391 A1 | 12/2021 | Jorasch |
| 2021/0397972 A1 | 12/2021 | Walters |
| 2021/0399911 A1 | 12/2021 | Jorasch |
| 2021/0400142 A1 | 12/2021 | Jorasch |
| 2021/0406004 A1 | 12/2021 | Ray |
| 2022/0019204 A1 | 1/2022 | Maury |
| 2022/0038902 A1 | 2/2022 | Mueck |
| 2022/0046302 A1 | 2/2022 | Shanson |
| 2022/0050677 A1 | 2/2022 | Kesiboyana et al. |
| 2022/0051162 A1 | 2/2022 | Fox |
| 2022/0066749 A1 | 3/2022 | Sankaran |
| 2022/0075515 A1 | 3/2022 | Floren |
| 2022/0091863 A1 | 3/2022 | Ignatowicz |
| 2022/0122025 A1* | 4/2022 | Amit .......................... G06F 8/77 |
| 2022/0165418 A1 | 5/2022 | Li |
| 2022/0172638 A1 | 6/2022 | Aharonson |
| 2022/0172639 A1 | 6/2022 | Aharonson |
| 2022/0172640 A1 | 6/2022 | Aharonson |
| 2022/0180766 A1 | 6/2022 | Aharonson |
| 2022/0180767 A1 | 6/2022 | Aharonson |
| 2022/0198562 A1 | 6/2022 | Cella |
| 2022/0230240 A1 | 7/2022 | Sliwka |
| 2022/0277210 A1 | 9/2022 | Malhotra |
| 2022/0277211 A1 | 9/2022 | Malhotra |
| 2022/0335362 A1 | 10/2022 | Nikain |
| 2022/0342910 A1 | 10/2022 | Dinh |
| 2022/0351195 A1 | 11/2022 | Quigley |
| 2022/0366494 A1 | 11/2022 | Cella |
| 2022/0375549 A1 | 11/2022 | Melkote |
| 2022/0379484 A1 | 12/2022 | Tremblay |
| 2022/0383019 A1 | 12/2022 | Tremblay |
| 2022/0386905 A1 | 12/2022 | Jacobs |
| 2022/0398133 A1 | 12/2022 | Gaddam |
| 2022/0398460 A1 | 12/2022 | Dalli |
| 2023/0048477 A1 | 2/2023 | Dorris, Jr. |
| 2023/0065458 A1 | 3/2023 | Abadi |
| 2023/0087736 A1 | 3/2023 | Arya |
| 2023/0098596 A1 | 3/2023 | Karri |
| 2023/0117135 A1 | 4/2023 | Quigley |
| 2023/0117430 A1 | 4/2023 | Quigley |
| 2023/0117725 A1 | 4/2023 | Quigley |
| 2023/0117801 A1 | 4/2023 | Quigley |
| 2023/0118213 A1 | 4/2023 | Quigley |
| 2023/0118717 A1 | 4/2023 | Quigley |
| 2023/0119584 A1 | 4/2023 | Quigley |
| 2023/0121779 A1 | 4/2023 | Quigley |
| 2023/0123346 A1 | 4/2023 | Quigley |
| 2023/0123865 A1 | 4/2023 | Quigley |
| 2023/0124040 A1 | 4/2023 | Quigley |
| 2023/0124608 A1 | 4/2023 | Quigley |
| 2023/0124806 A1 | 4/2023 | Quigley |
| 2023/0129494 A1 | 4/2023 | Quigley |
| 2023/0130594 A1 | 4/2023 | Quigley |
| 2023/0131603 A1 | 4/2023 | Quigley |
| 2023/0157533 A1 | 5/2023 | Chang |
| 2023/0173395 A1 | 6/2023 | Cella |
| 2023/0176862 A1* | 6/2023 | Jadhav .......... G06Q 10/063118 |
| | | 717/101 |
| 2023/0185361 A1 | 6/2023 | Lierle |
| 2023/0186913 A1 | 6/2023 | Patterson |
| 2023/0187073 A1 | 6/2023 | Foschini |
| 2023/0196182 A1 | 6/2023 | Zhang |
| 2023/0196341 A1 | 6/2023 | Quigley |
| 2023/0206329 A1 | 6/2023 | Cella |
| 2023/0206367 A1 | 6/2023 | Nelson |
| 2023/0214925 A1 | 7/2023 | Cella |
| 2023/0245101 A1 | 8/2023 | Quigley |
| 2023/0259988 A1 | 8/2023 | Friedman |
| 2023/0266733 A1 | 8/2023 | Chillar |
| 2023/0268026 A1 | 8/2023 | Spreafico |
| 2023/0274244 A1 | 8/2023 | Quigley |
| 2023/0274245 A1 | 8/2023 | Quigley |
| 2023/0294277 A1 | 9/2023 | Yang |
| 2023/0316280 A1 | 10/2023 | Sardari |
| 2023/0317256 A1 | 10/2023 | Tomer |
| 2023/0319099 A1 | 10/2023 | Karimibiuki |
| 2023/0335287 A1 | 10/2023 | Miller |
| 2023/0351184 A1 | 11/2023 | Di Fabbrizio |
| 2023/0351732 A1 | 11/2023 | Story |
| 2023/0376311 A1* | 11/2023 | Salem ................. G06F 11/3604 |
| 2023/0398686 A1 | 12/2023 | Tozeto Ramos |
| 2024/0005255 A1* | 1/2024 | Ghosh .......... G06Q 10/063112 |
| 2024/0095027 A1* | 3/2024 | Fanning ................... G06F 8/77 |

FOREIGN PATENT DOCUMENTS

| | | |
|---|---|---|
| IN | 202021035406 | 12/1899 |
| WO | WO2001016838 | 3/2001 |
| WO | WO2009027709 | 3/2009 |
| WO | WO2021171388 | 9/2021 |

OTHER PUBLICATIONS

Schokking, Arjan C. Project Planning and Tracking System: A comparative analysis. Philips Research Report, 2006 (Year: 2006).*

Trivedi, Sandeep, and Nikhil Patel. "Virtual employee monitoring: A review on tools, opportunities, challenges, and decision factors." Empirical Quests for Management Essences 1.1 (2021): 86-99 (Year: 2021).*

Avgustinov, Pavel, et al. "Tracking static analysis violations over time to capture developer characteristics." 2015 IEEE/ACM 37th IEEE International Conference on Software Engineering. vol. 1. IEEE, 2015 (Year: 2015).*

Mahdi, M. N., et al. Software Project Management Using Machine Learning Technique—A Review. Applied Sciences. 2021, 11, 5183. https://doi.org/10.3390/app11115183.

PCT/US2023/86564 International Search Report and Written Opinion mailed May 24, 2024, 5 pages.

* cited by examiner

Together

PROJECTS
HR Automation
Self-Service Portal

REPORTS
Inspect
Project Allocations
Source Activity
Workforce

ACTIVITY
HR Automation
Self-Service Portal
My Activity

MENTORING
Jennifer Murphy
Juan Ramos
Tom Andersson

/ Reports / Workforce

REPORTS
Workforce

| Engineer | Overall Rating | Coding Rate | Activity Level | Code Churn | Task Duration | Days Active | Daily IDE Hours | Throughput | Context Switch |
|---|---|---|---|---|---|---|---|---|---|
| Anna Milic | 4.3 | 2.8 | 2.0 | 5.0 | 5.0 | 5.0 | 5.0 | 5.0 | 5.0 |
| Jennifer Murphy | 4.2 | 3.6 | 5.0 | 5.0 | 5.0 | 4.0 | 0.9 | 4.9 | 5.0 |
| Juan Ramos | 3.7 | 2.9 | 4.4 | 5.0 | 3.9 | 2.5 | 3.9 | 1.8 | 5.0 |
| Philip Tennyson | 3.3 | 3.4 | 4.3 | 3.8 | 2.2 | 3.5 | 4.7 | 2.1 | 4.3 |
| Tom Andersson | 3.8 | 5.0 | 5.0 | 0.0 | 5.0 | 3.9 | 2.6 | 4.6 | 5.0 |

Anna Milic
Logout

Fig. 8A monitor behavior of software developers of a multi-task code development project through interaction with at least an integrated development environment 101 exploration events comprising browsing source code for understanding or investigation 103 coding events comprising actively modifying source code 105 debugging events comprising interacting with a debugger stepping through code in a debugging phase 107 testing events comprising coding or running unit tests and test automation 109 provide a predictive model of the code development project adapted to predict a future status of the code development project 111 update the predictive model based on an actual subsequent status of the code development project 113 output a prediction dependent on a status of the code development project at a future time 115 suggest improvement opportunities to accelerate completion of the code development project and/or improvement opportunities to reduce risks of the code development project and/or a mentoring opportunity for at least one software developer by at least one other software developer 117 determine a risk in the code development project and suggesting a mentoring opportunity for at least one software developer to mitigate the risk 119 determine a risk inherent in the behavior of a software developer, and suggesting a change in behavior of the software developer based on the determined risk or mentoring the software developer to alter the behavior of the software developer or issuing an alert to a mentor selectively in dependence thereon 121 produce an alert based on activity of a respective software developer or a determined risk of a task of the software development project or a determined complexity of a task of the software development project 123 maintaining a developer-specific profile for each software developer, wherein the predictive model is code development project staffing-dependent 125 visualize a developer-specific daily work performance 127 determine a work level of each software developer; and visualize the work level of each software developer, or provide a supervisor visualization interface reflecting the determined work level of each software developer 129 analyze risks of the code development project 131 visualize the analyzed risks 133 estimate a current state of the code development project 135 provide a real-time output of the estimated current state of the code development project 137 determine or estimate a task complexity for each respective task or task-in-progress or completed task, the prediction being further dependent on the determined task complexity for at least one task 139 extrapolate a code development project pattern based on the task complexity and an associated risk for each respective task 141 present at least one visualization of the code development project pattern 143 determine an efficiency of a respective software developer or software developers, based on the at least the code development project pattern 145 outputting the prediction dependent on the status of the code development project at the future time comprises forecasting a release date and a confidence or confidence range of the forecast release date 147 the code development project comprises a plurality of tasks, and the predictive model is responsive to a task complexity for each remaining respective task 149 alter a staffing of software developers in dependence on the prediction 151 installing a software plugin to the integrated development environment that tracks interactions, and aggregates statistics for different types of interactions 153 instrument the integrated development environment to track interaction with each software developer 155 determine a directness of software development 157 determining an amount of time a respective software developer spends exploring before coding 159

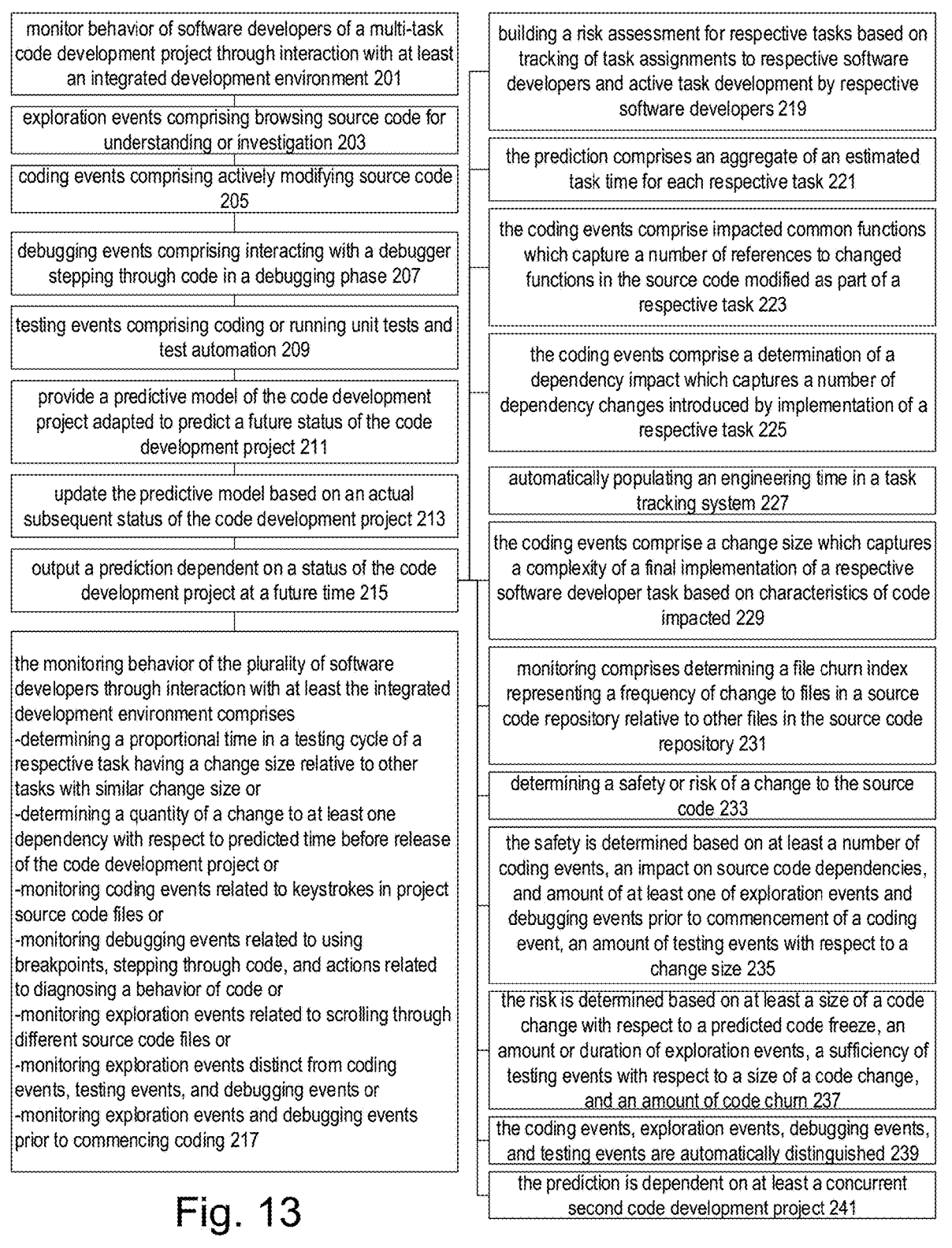

Fig. 12 monitor behavior of software developers of a multi-task code development project through interaction with at least an integrated development environment 201 exploration events comprising browsing source code for understanding or investigation 203 coding events comprising actively modifying source code 205 debugging events comprising interacting with a debugger stepping through code in a debugging phase 207 testing events comprising coding or running unit tests and test automation 209 provide a predictive model of the code development project adapted to predict a future status of the code development project 211 update the predictive model based on an actual subsequent status of the code development project 213 output a prediction dependent on a status of the code development project at a future time 215 the monitoring behavior of the plurality of software developers through interaction with at least the integrated development environment comprises
-determining a proportional time in a testing cycle of a respective task having a change size relative to other tasks with similar change size or
-determining a quantity of a change to at least one dependency with respect to predicted time before release of the code development project or
-monitoring coding events related to keystrokes in project source code files or
-monitoring debugging events related to using breakpoints, stepping through code, and actions related to diagnosing a behavior of code or
-monitoring exploration events related to scrolling through different source code files or
-monitoring exploration events distinct from coding events, testing events, and debugging events or
-monitoring exploration events and debugging events prior to commencing coding 217 building a risk assessment for respective tasks based on tracking of task assignments to respective software developers and active task development by respective software developers 219 the prediction comprises an aggregate of an estimated task time for each respective task 221 the coding events comprise impacted common functions which capture a number of references to changed functions in the source code modified as part of a respective task 223 the coding events comprise a determination of a dependency impact which captures a number of dependency changes introduced by implementation of a respective task 225 automatically populating an engineering time in a task tracking system 227 the coding events comprise a change size which captures a complexity of a final implementation of a respective software developer task based on characteristics of code impacted 229 monitoring comprises determining a file churn index representing a frequency of change to files in a source code repository relative to other files in the source code repository 231 determining a safety or risk of a change to the source code 233 the safety is determined based on at least a number of coding events, an impact on source code dependencies, and amount of at least one of exploration events and debugging events prior to commencement of a coding event, an amount of testing events with respect to a change size 235 the risk is determined based on at least a size of a code change with respect to a predicted code freeze, an amount or duration of exploration events, a sufficiency of testing events with respect to a size of a code change, and an amount of code churn 237 the coding events, exploration events, debugging events, and testing events are automatically distinguished 239 the prediction is dependent on at least a concurrent second code development project 241

Fig. 13

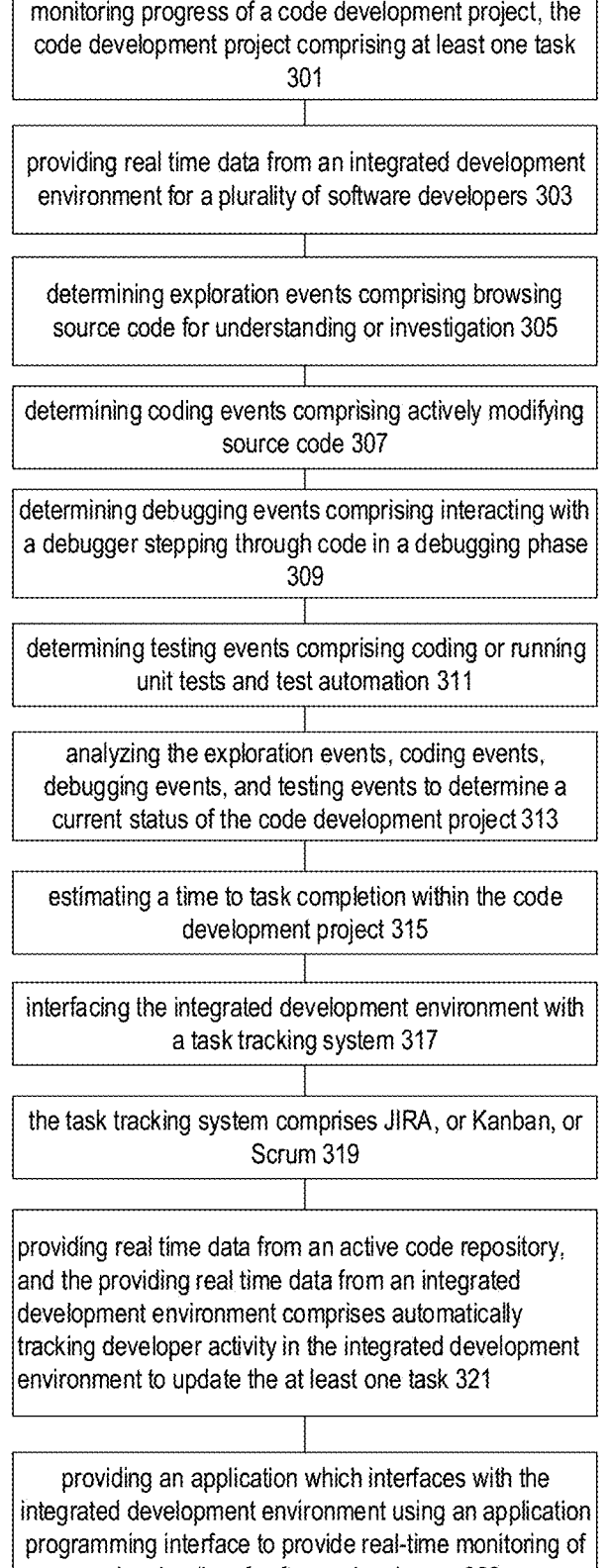

monitoring progress of a code development project, the code development project comprising at least one task
301 providing real time data from an integrated development environment for a plurality of software developers 303 determining exploration events comprising browsing source code for understanding or investigation 305 determining coding events comprising actively modifying source code 307 determining debugging events comprising interacting with a debugger stepping through code in a debugging phase 309 determining testing events comprising coding or running unit tests and test automation 311 analyzing the exploration events, coding events, debugging events, and testing events to determine a current status of the code development project 313 estimating a time to task completion within the code development project 315 interfacing the integrated development environment with a task tracking system 317 the task tracking system comprises JIRA, or Kanban, or Scrum 319 providing real time data from an active code repository, and the providing real time data from an integrated development environment comprises automatically tracking developer activity in the integrated development environment to update the at least one task 321 providing an application which interfaces with the integrated development environment using an application programming interface to provide real-time monitoring of the plurality of software developers 323

Fig. 14

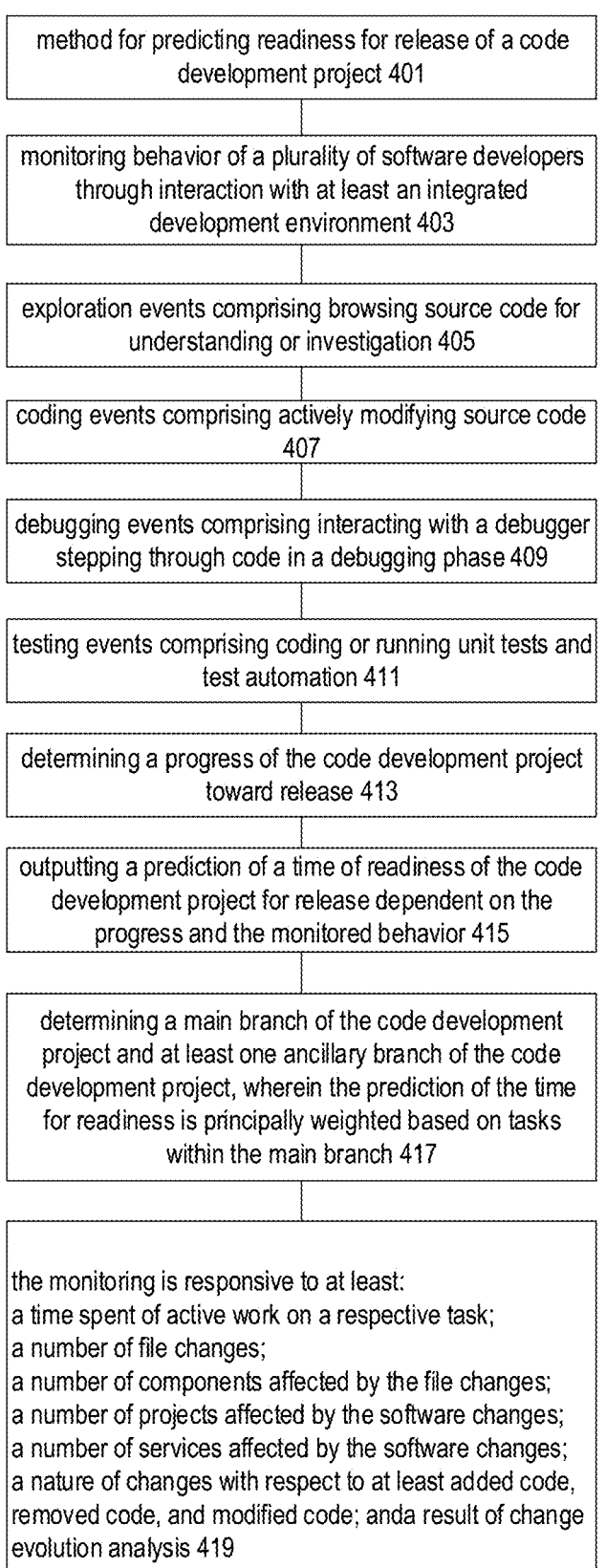

method for predicting readiness for release of a code
development project 401 monitoring behavior of a plurality of software developers
through interaction with at least an integrated
development environment 403 exploration events comprising browsing source code for
understanding or investigation 405 coding events comprising actively modifying source code
407 debugging events comprising interacting with a debugger
stepping through code in a debugging phase 409 testing events comprising coding or running unit tests and
test automation 411 determining a progress of the code development project
toward release 413 outputting a prediction of a time of readiness of the code
development project for release dependent on the
progress and the monitored behavior 415 determining a main branch of the code development
project and at least one ancillary branch of the code
development project, wherein the prediction of the time
for readiness is principally weighted based on tasks
within the main branch 417 the monitoring is responsive to at least:
a time spent of active work on a respective task;
a number of file changes;
a number of components affected by the file changes;
a number of projects affected by the software changes;
a number of services affected by the software changes;
a nature of changes with respect to at least added code,
removed code, and modified code; anda result of change
evolution analysis 419

Fig. 15

METHOD AND SYSTEM TO USE REAL-TIME ACTIVITY TO PROVIDE WORKFORCE MONITORING

CROSS REFERENCE TO RELATED APPLICATIONS

The present application is a non-provisional of, and claims benefit of priority from U.S. Provisional Patent Application No. 63/436,398, filed Dec. 30, 2023, the entirety of which is expressly incorporated herein by reference.

FIELD OF THE INVENTION

The present invention relates to the field of performance monitoring and predictive analytics, and more particularly to a system and method for monitoring software development teams and predicting code development project progress and completion.

INCORPORATION BY REFERENCE AND INTERPRETATION OF LANGUAGE

Citation or identification of any reference herein, in any section of this application, shall not be construed as an admission that such reference is necessarily available as prior art to the present application. The disclosures of each reference disclosed herein, whether U.S. or foreign patent literature, or non-patent literature, are hereby incorporated by reference in their entirety in this application, and shall be treated as if the entirety thereof forms a part of this application.

All cited or identified references are provided for their disclosure of technologies to enable practice of the present invention, to provide basis for claim language, and to make clear applicant's possession of the invention with respect to the various aggregates, combinations, and subcombinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein (which may be treated as counter examples), and is evidence of a proper interpretation by persons of ordinary skill in the art of the terms, phrase and concepts discussed herein, without being limiting as the sole interpretation available.

The present specification is not to be interpreted by recourse to lay dictionaries in preference to field-specific dictionaries or usage. Where a conflict of interpretation exists, the hierarchy of resolution shall be the express specification, references cited for propositions, incorporated references, the inventors' prior publications relating to the field, academic literature in the field, commercial literature in the field, field-specific dictionaries, lay literature in the field, general purpose dictionaries, and common understanding. Where the issue of interpretation of claim amendments arises, the hierarchy is modified to include arguments made during the prosecution and accepted without retained recourse.

BACKGROUND OF THE INVENTION

In software development efforts, understanding the current status, and time, costs, and risks to completion of the project are particular issues.

The objective status of the project before completion may be difficult to ascertain, because code tasks may proceed in parallel, debugging can take an inordinate amount of time, and in some cases code testing may reveal a need for backtracking.

Assessment of code maturity is currently imperfect, and therefore predictions based on the current measurements of code maturity are likewise impaired. As such, extrapolations based on predictions were not reliable.

U.S. Pat. No. 10,083,027 relates to systems and methods for construction of development and deployment environments for use at various stages of software development and delivery. Various embodiments are configured to deliver these constructed environments to reproduce faithfully the state of an application at a given revision of the application's source or configuration. The branched development system can be configured to use the constructed environments to offer a variety of novel results and benefits that simplify the development, test, deployment, and debugging tasks commonly associated with software throughout its lifecycle.

U.S. 2021/0406004 discloses an embodiment of the present invention is directed to a code audit tool that intelligently analyzes and profiles code, such as Python code, based on a variety of previously unmeasured factors and metrics including a set of software dimensions, such as Algorithmic Complexities; Software Sizing Metrics; Anti-Pattern Implementations; Maintainability Metrics; Dependency Mappings; Runtime Metrics; Testing Metrics; and Security Metrics. Once this analysis is complete, a standardized report card or other scoring interface may be generated. This may include analytical findings as well as suggestions and recommend steps so that developers can make informed decisions, enhance their code bases and improve the score assigned to their code.

U.S. 2017/0075790 provides techniques for integrating source code analysis tools with a code review tool. A user submits a code change to the code review tool and one or more code analysis tools are automatically initiated to analyze the changed code. Results of the code analysis tool(s) are automatically provided back to the code review tool. Additionally or alternatively, one or more tests are automatically run to test one or more executables that are based on the changed code. Results of the test(s) are automatically provided to the code review tool. In this way, an effect of a code change is automatically determined and available for review along with the code change. The results of any code analysis tools and/or tests may be posted synchronously or asynchronously with the corresponding code change.

U.S. Pat. No. 10,732,935 discloses technologies can directly integrate status data relating to a source code repository into a client application, such as a graphical software development interface. For example, the disclosed technologies enable a client application executing on a computer used by a software developer to generate and display, on the developer's computer, a visual representation of status data that relates to a cloud based source code repository, when the status data relates to an action executed by the client application that involves the source code repository.

U.S. Pat. No. 10,061,578 describes methods and systems for configuring a data store for tracking and auditing real time events associated with an end-to-end development lifecycle of a software product across different types of software development tools in Agile development environments. The data store stores vast numbers of records containing metadata that describe different types of real time events using different types of tools. Each record includes a set of defined fields that enable the records to be linked across the various tools and events throughout the end-to-end development lifecycle of a software product. Where the event is a compilation event detected in a compiler, the event metadata defining the compilation event is embedded in the compiled code as text for tracking of the development process even after the product is compiled into a binary form.

U.S. 2021/0406004 provides a system and method for implementing a code audit tool. A code audit tool intelligently analyzes and profiles code, such as Python code, based on a variety of previously unmeasured factors and metrics including a set of software dimensions, such as algorithmic complexities; software sizing metrics; anti-pattern implementations; maintainability metrics; dependency mappings; runtime metrics; testing metrics; and security metrics. Once this analysis is complete, a standardized report card or other scoring interface may be generated. This may include analytical findings as well as suggestions and recommend steps so that developers can make informed decisions, enhance their code bases and improve the score assigned to their code.

CN109901820A provides an optimization method for the Airborne Software agile development process meeting DO-178B/C, by defining project personnel's model and task model, estimate project personnel's working efficiency and task scale.

U.S. Pat. No. 6,519,763 provides time management and task completion and prediction software, by which project completion can be ascertained and management of a project can be maintained. The software application is a web-based application which enables users to proactively manage and accurately predict strategic software development and deliverables. Data is automatically gathered by various tools within the organization, such as scheduling, defect tracking, requirements management and software quality tools, fed into an applications server, to generate a statistically significant probability curve. This curve is then compared to the original planned schedule of product delivery to determine if the project is meeting its targets. Based upon this comparison, the software application predicts a probable delivery date based upon the various inputs and variables from the development process. In addition, the application server also generate early warning alerts, as needed and indicated.

WO2001016838 provides a project management, scheduling system and method that uses system dynamics modeling methodology to describe non-linear functions such as rework and time-varying productivity and quality within a project management tool. The project management software permits a user to configure a project model and apply or edit project characteristics as part of the project model analysis. At the configuration stage, the project management software imports a CPM file from a scheduling software product and clusters individual tasks in the project model, or in the alternative, permits a user to manually enter the project management information. Project characteristics specified by the user may then be applied to the project model, either by accessing a database of system dynamics model elements or by direct input of system dynamics functions and relationships. After model configuration, analysis can be performed. At the analysis stage, a user of the project management software can specify changes to assumptions in the project model and execute a plurality of simulations of the project model. After executing simulations, the user can examine them within the system and optionally export results back into a CPM file format that can be understood by some CPM based scheduling software products.

US20180210709, US20170083290, U.S. Ser. No. 10/248,387 and U.S. Ser. No. 10/001,975 provide methods and systems for developing a software application through requirements specification, design, effort estimation, assigning and tracking work items, development, testing, collaboration and project management. The system is structured as an integrated software development system allowing for structured, and systematic set up of requirements specification (including workflow, user interface, business rules and integrations), technical design for UI features and integrations using design patterns, automated effort estimation, automated story card and task creation. The system provides predictive modeling of defects that allows for forecasting of defect completion rate. In the preferred embodiment, the system is delivered as a multi-tenant Software as a Service.

U.S. Ser. No. 10/359,997, U.S. Pat. Nos. 9,785,411, 9,141,921 and US20150301804 disclose project modeling using iterative variable defect forecasts. Project modeling is conducted using variable defect arrival rate or variable defect rate density parameters. These defect rates may be updated on an iteration by iteration basis and may be used to provide remediation and further project modeling, remediation, and prediction.

US20200133830 and U.S. Ser. No. 11/347,629 provide a system and method for forecasting a quality of a software release using machine learning. In some examples, a server may retrieve and parse test results associated with testing a software package. The server may determine a weighted sum of a software feature index associated with a quality of the plurality of features, a defect index associated with the defects identified by the test cases, a test coverage index indicating a pass rate of the plurality of test cases, a release reliability index associated with results of executing regression test cases included in the test cases, and an operational quality index associated with resources and an environment associated with the software package. The server may use a machine learning algorithm, such as a time series forecasting algorithm, to forecast a release status of the software package. The server may determine, based on the release status, whether the software package is to progress from a current phase to a next phase of a development cycle.

US20220335362 provides an artificial intelligence-based business process management visualization, development and monitoring method. A graphical user interface is provided on a display device for interaction with operations personnel associated with a process to be performed. Information is received from the operations personnel, defining one or more tasks to perform the process. Respective rulesets associated with the respective tasks are received from technical personnel, each respective ruleset defining procedures to complete a respective task, one or more of the respective rulesets implementing a machine learning algorithm to complete the respective task. Information about the one or more tasks is displayed on the graphical user interface during performance of the process. An artificial intelligence process estimates a current status of the process, producing a current status estimate, wherein the estimating comprises estimating a status of the machine learning algorithm; and displaying process status information on the graphical user interface wherein the process status information is based on the current status estimate.

US20130066789, US20100305994 and WO2009027709 provide a project management system comprising a means for storing each of a plurality of process definitions, a plurality of phase definitions, a plurality of task definitions, an association between each task definition and a selected process definition and a selected phase definition, and task status information associated with each task, and a display means for displaying a two-dimensional grid arrangement in which a first dimension is subdivided according to process definitions and a second dimension is subdivided according to phase definitions, thereby to define a plurality of cells at the intersection of the two dimensions, a plurality of the cells thus defined therefore representing tasks, in respect of which task status information is displayed, a means for storing user identities and user rights associated with the user identities will allow the display means to be adapted to limit the display according to the user rights.

US20210304105 provides dynamic quality metrics forecasting and management systems and methods. A method includes receiving, by a computing device, parameter data from one or more data sources for selected parameters, wherein the parameters are associated with one or more processes; generating, by the computing device, output values for plural quality metrics based on the parameter data; identifying, by the computing device, relationships between the plural quality metrics based on changes in the received parameter data and output values for the plural quality metrics over time; receiving, by the computing device, user-selected values for the selected parameters; and generating, by the computing device, predicted output values for the quality metrics based on the identified relationships between the quality metrics and the user-selected values.

US20220051162 provides an enterprise software development dashboard tool for monitoring business performance, the system comprising: a processor, a memory operatively coupled to the processor and a connector component configured to receive data from business attributes of at least one source program and an analytical component configured to generate an analytics from the received data, the analytical component comprising an analytics engine to track the at least one source program status using quality parameters, and an agile module to provide continuous improvement steps to the business attributes using an agile maturity index score, wherein business formulae are applied to generate the analytics from the received data by the analytical component, and wherein the agile maturity index score is calculated for each of the business attributes by the analytical component using the generated analytics.

WO2021171388 provides an assistance information generation device, assistance information generation method, and program recording medium. This assistance information generation device is provided with: a learning unit that generates at least one prediction model through machine learning using project information about past projects in order to generate assistance information for providing assistance in confirming validity and performing verification of development of a product, a service, a system, and the like by using project information about a target project; and a prediction unit that predicts at least one assistance data item by inputting the project information about the target project to the prediction model.

CN113742248 discloses a method and system for predicting organization process based on project measurement data. The method comprises: collecting data: collecting measurement data of the completed project, and finding out measurement items related to the organization process in the measurement data; establishing a prediction model: establishing a prediction model for predicting the organizational process by applying the measurement items related to the organizational process; checking and verifying: checking and verifying the model by four modes of goodness-of-fit inspection, integral significance inspection of regression equation, significance inspection of regression coefficient and residual analysis; and model correction: adjusting the measurement items influencing the organization process according to the result of the model checking and verifying, and removing the measurement items which do not influence the organization process; reporting the predicted conclusion: and obtaining a final conclusion according to the result and the prediction after the model is corrected, and giving out whether the project measurement data can predict the organization process.

IN2006CH02443 discloses iterative software development methods and system with a balanced approach for feature-based development and leveraging on at least one customized process. The method combines an agile methodology with a plan driven approach for implementing the agile methodology in a global delivery model (GDM) environment by extracting and addressing a plurality of business requirement components of a software development life cycle. Moreover, the method identifies a plurality of project situational risks using a client landscape for determining applicability of the agile methodology. In addition, the method predicts a matrix and a plurality of metrics for handling the plurality of project situational risks of the agile methodology. Furthermore, the method customizes the GDM environment by translating the identified plurality of project situational risks of the agile methodology as the at least one scenario of the GDM environment.

IN202021035406 provides an enterprise software development dashboard tool for monitoring business performance. A module is configured to receive data from business attributes of at least one source program and an analytical component configured to generate an analytics from the received data comprising an analytics engine to track the at least one source program status using quality parameters, and an agile module to provide continuous improvement steps to the business attributes using an agile maturity index score, wherein business formulae are applied to generate the analytics from the received data by the analytical component, and wherein the agile maturity index score is calculated for each of the business attributes by the analytical component using the generated analytics.

Fellir, Fadoua, Khalid Nafil, Rajaa Touahni, and Lawrence Chung. "Improving case based software effort estimation using a multi-criteria decision technique." In Computer Science On-line Conference, pp. 438-451. Springer, Cham, 2018, discloses a method for producing an accurate effort estimate for software project management. A framework for software effort estimation is provided, which takes an incremental approach on one hand, using a case-based reasoning (CBR) model, while considering a comprehensive set of different types of requirements models on the other hand, including functional requirements (FRs), non-functional requirements (NFRs), and domain properties (DPs). Concerning the use of CBR, this framework offers a multi-criteria technique for enhancing the accuracy of similarity measures among cases of multiple past projects that are similar to the current software project, towards determining and selecting the most similar one.

Software Effort Estimation is used to predict the number of hours of work required to complete the task. Software Effort Estimation helps in planning, scheduling, budgeting a project. Various experiments were proposed to predict effort alike expert judgment, analogy based estimations, regression estimations, classification approaches, deep learning algorithms. Varshini, AG Priya, K. Anitha Kumari, D.

Janani, and S. Soundariya. "Comparative analysis of Machine learning and Deep learning algorithms for Software Effort Estimation." In Journal of Physics: Conference Series, vol. 1767, no. 1, p. 012019. IOP Publishing, 2021, provides a comparison of deepnet, neuralnet, support vector machine and random forest algorithms.

Neclu, Lalband, and D. Kavitha. "Estimation of software quality parameters for hybrid agile process model." SN Applied Sciences 3, no. 3 (2021): 1-11 discusses estimation of code development effort.

Nhung, Ho Le Thi Kim, Huynh Thai Hoc, and Vo Van Hai. "A review of use case-based development effort estimation methods in the system development context." Proceedings of the Computational Methods in Systems and Software (2019): 484-499, discusses Software Effort Estimation, a critical factor in the early phase of the software development life-cycle and hence—the success or failure of a software project, which depends on the accuracy of the estimated effort.

Ertuğrul, Egemen, Zakir Baytar, çağatay çatal, and Ömer Can Muratli. "Performance tuning for machine learning-based software development effort prediction models." Turkish Journal of Electrical Engineering and Computer Sciences 27, no. 2 (2019): 1308-1324 discusses software development effort estimation. Machine learning algorithms were investigated in conjunction with feature transformation, feature selection, and parameter tuning techniques to estimate the development effort accurately and a model was proposed as part of an expert system. The proposed model uses a multilayer perceptron as its underlying algorithm, applies binning of the features to transform continuous features and one-hot-encoding technique to transform categorical data into numerical values as feature transformation techniques, does feature selection based on the principal component analysis method, and performs parameter tuning based on the GridSearch algorithm. See also, Marapelli, Bhaskar, and Prasadu Peddi. "Performance Tuning For Machine Learning-Based Software Development Effort Prediction Models." Bulletin Monumental—ISSN/e-ISSN 0007-473X, Volume 21: Issue VII (2020), pp. 258-265.

ICSSP2018 SI, Binish Tanveer, Anna Maria Vollmer, Stefan Braun, and Nauman bin Ali. "An evaluation of effort estimation supported by change impact analysis in agile software development." Journal of Software: Evolution and Process 31, no. 5 (2019): e2165, discusses a hybrid method of change impact analysis in agile software development, that utilizes change impact analysis information for improving effort estimation, using Gradient Boosted Trees (GBT). See also:

AG, Priya Varshini, and Vijayakumar Varadarajan. "Estimating software development efforts using a random forest-based stacked ensemble approach." Electronics 10, no. 10 (2021): 1195.

Alnoukari, Mouhib, Zaidoun Alzoabi, and Saiid Hanna. "Applying adaptive software development (ASD) agile modeling on predictive data mining applications: ASD-DM methodology." In 2008 International Symposium on Information Technology, vol. 2, pp. 1-6. IEEE, 2008.

Alnoukari, Mouhib. "ASD-BI: A Knowledge Discovery Process Modeling Based on Adaptive Software Development Agile Methodology." In Business Intelligence and Agile Methodologies for Knowledge-Based Organizations: Cross-Disciplinary Applications, pp. 183-207. IGI Global, 2012.

Baghel, Akanksha, Meemansa Rathod, and Pradeep Singh. "Software Effort Estimation using parameter tuned Models." arXiv preprint arXiv:2009.01660 (2020);

BaniMustafa, Ahmed. "Predicting software effort estimation using machine learning techniques." In 2018 8th International Conference on Computer Science and Information Technology (CSIT), pp. 249-256. IEEE, 2018.

Benala, Tirimula Rao, and Rajib Mall. "DABE: differential evolution in analogy-based software development effort estimation." Swarm and Evolutionary Computation 38 (2018): 158-172;

Bibi, S., and I. Stamelos. "Software process modeling with Bayesian belief networks." In Proceedings of 10th International Software Metrics Symposium (Metrics 2004), vol. 14, p. 16. 2004.

Bilgaiyan, Saurabh, Kunwar Aditya, Samaresh Mishra, and Madhabananda Das. "Chaos-based modified morphological genetic algorithm for software development cost estimation." In Progress in Computing, Analytics and Networking, pp. 31-40. Springer, Singapore, 2018;

Bilgaiyan, Saurabh, Prabin Kumar Panigrahi, and Samaresh Mishra. "Chaos-Based Modified Morphological Genetic Algorithm for Effort Estimation in Agile Software Development." In A Journey Towards Bio-inspired Techniques in Software Engineering, pp. 89-102. Springer, Cham, 2020;

Bilgaiyan, Saurabh, Samaresh Mishra, and Madhabananda Das. "Effort estimation in agile software development using experimental validation of neural network models." International Journal of Information Technology 11, no. 3 (2019): 569-573.

Blythe, Jim, John Bollenbacher, Di Huang, Pik-Mai Hui, Rachel Krohn, Diogo Pacheco, Goran Muric et al. "Massive multi-agent data-driven simulations of the github ecosystem." In International Conference on Practical Applications of Agents and Multi-Agent Systems, pp. 3-15. Springer, Cham, 2019.

Butt, Shariq Aziz, Muhammad Imran Tariq, Tauseef Jamal, Arshad Ali, Jorge Luis Díaz Martinez, and Emiro De-La-Hoz-Franco. "Predictive variables for agile development merging cloud computing services." IEEE Access 7 (2019): 99273-99282.

Choetkiertikul, Morakot, Hoa Khanh Dam, Truyen Tran, Aditya Ghose, and John Grundy. "Predicting delivery capability in iterative software development." IEEE Transactions on Software Engineering 44, no. 6 (2017): 551-573.

Chulani, Sunita. "Bayesian analysis of software cost and quality models." In Proceedings IEEE International Conference on Software Maintenance. ICSM 2001, pp. 565-568. IEEE, 2001.

Devnani-Chulani, Sunita. Bayesian analysis of software cost and quality models. University of Southern California, 1999.

Eduardo Carbonera, Carlos, Kleinner Farias, and Vinicius Bischoff. "Software development effort estimation: A systematic mapping study." IET Software 14, no. 4 (2020): 328-344;

Fenton, Norman, Martin Neil, William Marsh, Peter Hearty, David Marquez, Paul Krause, and Rajat Mishra. "Predicting software defects in varying development lifecycles using Bayesian nets." Information and Software Technology 49, no. 1 (2007): 32-43.

Fenton, Norman, Paul Krause, and Martin Neil. "A probabilistic model for software defect prediction." IEEE Transactions on Software Engineering 44, no. 0 (2001): 1-35.

Fenton, Norman, Paul Krause, and Martin Neil. "Software measurement: Uncertainty and causal modeling." IEEE software 19, no. 4 (2002): 116-122.

9 10

Fernández-Diego, Marta, Erwin R. Méndez, Fernando González-Ladrón-De-Guevara,

Silvia Abrahão, and Emilio Insfran. "An update on effort estimation in agile software development: a systematic literature review." IEEE Access 8 (2020): 166768-166800;

Gitinabard, Niki, Ruth Okoilu, Yiqao Xu, Sarah Heckman, Tiffany Barnes, and Collin Lynch. "Student Teamwork on Programming Projects: What can GitHub logs show us?." arXiv preprint arXiv:2008.11262 (2020).

Hammad, Mustafa, and Abdulla Alqaddoumi. "Features-level software effort estimation using machine learning algorithms." In 2018 International Conference on Innovation and Intelligence for Informatics, Computing, and Technologies (3ICT), pp. 1-3. IEEE, 2018.

Hearty, Peter, Norman Fenton, David Marquez, and Martin Neil. "Predicting project velocity in XP using a learning dynamic bayesian network model." IEEE Transactions on Software Engineering 35, no. 1 (2008): 124-137.

Hosni, Mohamed, Ali Idri, and Alain Abran. "Evaluating filter fuzzy analogy homogenous ensembles for software development effort estimation." Journal of Software: Evolution and Process 31, no. 2 (2019): €2117;

Hosni, Mohamed, and Ali Idri. "Software Development Effort Estimation Using Feature Selection Techniques." In SoMeT, pp. 439-452. 2018;

Iqbal, M. Aqeel, F. A. Ammar, Adel Rashed Aldaihani, Tehmina Karamat Ullah Khan, and Asadullah Shah. "Predicting Most Effective Software Development Teams by Mapping MBTI Personality Traits with Software Life-cycle Activities." In 2019 IEEE 6th International Conference on Engineering Technologies and Applied Sciences (ICETAS), pp. 1-5. IEEE, 2019.

Jha, Shambhu Kr, and R. K. Mishra. "Predicting and accessing security features into component-based software development: a critical survey." In Software Engineering, pp. 287-294. Springer, Singapore, 2019.

Karimi, Amir, and Taghi Javdani Gandomani. "Software development effort estimation modeling using a combination of fuzzy-neural network and differential evolution algorithm." International Journal of Electrical and Computer Engineering 11, no. 1 (2021): 707.

Kaushik, Anupama, and Niyati Singal. "A hybrid model of wavelet neural network and metaheuristic algorithm for software development effort estimation." International Journal of Information Technology (2019): 1-10.

Krohn, Rachel, Diogo Pacheco, Goran Muric, Anna Sapienza, Alexey Tregubov, Yong-Yeol Ahn, Alessandro Flammini et al. "Massive Multi-agent Data-Driven Simulations of the GitHub Ecosystem." In Advances in Practical Applications of Survivable Agents and Multi-Agent Systems: The PAAMS Collection: 17th International Conference, PAAMS 2019, Ávila, Spain, Jun. 26-28, 2019, Proceedings, vol. 11523, p. 3. Springer, 2019.

Mahmood, Yasir, Nazri Kama, and Azri Azmi. "A systematic review of studies on use case points and expert-based estimation of software development effort." Journal of Software: Evolution and Process 32, no. 7 (2020): e2245.

Mahmood, Yasir, Nazri Kama, Azri Azmi, Ahmad Salman Khan, and Mazlan Ali. "Software effort estimation accuracy prediction of machine learning techniques: A systematic performance evaluation." Software: Practice and Experience 52, no. 1 (2022): 39-65;

Mair, Carolyn, Martin Shepperd, and Magne Jørgensen. "An analysis of data sets used to train and validate cost prediction systems." ACM SIGSOFT software engineering notes 30, no. 4 (2005): 1-6.

Malgonde, Onkar, and Kaushal Chari. "An ensemble-based model for predicting agile software development effort." Empirical Software Engineering 24, no. 2 (2019): 1017-1055.

Marapelli, Bhaskar, and Prasadu Peddi. "Software Development Effort Duration and Cost Estimation using Linear Regression and K-Nearest Neighbors Machine Learning Algorithms." International Journal of Innovative Technology and Exploring Engineering 9, no. 2 (2019): 1043-1047.

Mohsin, Zainab Rustum. "Investigating the use of an adaptive neuro-fuzzy inference system in software development effort estimation." Iraqi Journal For Computer Science and Mathematics 2, no. 2 (2021): 18-24.

Ortu, Marco, Tracy Hall, Michele Marchesi, Roberto Tonelli, David Bowes, and Giuseppe Destefanis. "Mining communication patterns in software development: A github analysis." In Proceedings of the 14th international conference on predictive models and data analytics in software engineering, pp. 70-79. 2018.

Pendharkar, Parag C., Girish H. Subramanian, and James A. Rodger. "A probabilistic model for predicting software development effort." IEEE Transactions on software engineering 31, no. 7 (2005): 615-624.

Saadat, Samaneh, Olivia B. Newton, Gita Sukthankar, and Stephen M. Fiore. "Analyzing the productivity of GitHub teams based on formation phase activity." In 2020 IEEE/WIC/ACM International Joint Conference on Web Intelligence and Intelligent Agent Technology (WI-IAT), pp. 169-176. IEEE, 2020.

Saeed, Ayesha, Wasi Haider Butt, Farwa Kazmi, and Madeha Arif. "Survey of software development effort estimation techniques." In Proceedings of the 2018 7th International Conference on software and computer applications, pp. 82-86. 2018.

Shah, Jalal, and Nazri Kama. "Extending function point analysis effort estimation method for software development phase." In Proceedings of the 2018 7th International Conference on Software and Computer Applications, pp. 77-81. 2018;

Shah, Jalal, Nazri Kama, and Saiful Adli Ismail. "An empirical study with function point analysis for software development phase method." In Proceedings of the 7th International Conference on Software and Information Engineering, pp. 7-11. 2018;

Shah, Muhammad Arif, Dayang Norhayati Abang Jawawi, Mohd Adham Isa,

Muhammad Younas, Abdelzahir Abdelmaboud, and Fauzi Sholichin. "Ensembling artificial bee colony with analogy-based estimation to improve software development effort prediction." IEEE Access 8 (2020): 58402-58415.

Sosa, Manuel E. "A structured approach to predicting and managing technical interactions in software development." Research in Engineering Design 19, no. 1 (2008): 47-70.

Srinivasan, Krishnamoorthy, and Douglas Fisher. "Machine Learning Approaches to Estimating Software Development Effort." Series on Software Engineering and Knowledge Engineering 16 (2005): 52.

Srinivasan, Krishnamoorthy, and Douglas Fisher. "Machine learning approaches to estimating software development effort." IEEE Transactions on Software Engineering 21, no. 2 (1995): 126-137.

Usman, Muhammad, Ricardo Britto, Lars-Ola Damm, and Jürgen Börstler. "Effort estimation in large-scale software development: An industrial case study." Information and Software technology 99 (2018): 21-40;

Vaid, Kamna, and Udayan Ghose. "Predictive analysis of manpower requirements in scrum projects using regression techniques." Procedia Computer Science 173 (2020): 335-344.

Venkataiah, V., Ramakanta Mohanty, and M. Nagaratna. "Prediction of software cost estimation using spiking neural networks." In Smart Intelligent Computing and Applications, pp. 101-112. Springer, Singapore, 2019.

Zakrani, Abdelali, Mustapha Hain, and Ali Idri. "Improving software development effort estimating using support vector regression and feature selection." IAES International Journal of Artificial Intelligence 8, no. 4 (2019): 399.

Zakrani, Abdelali, Mustapha Hain, and Abdelwahed Namir. "Software development effort estimation using random forests: an empirical study and evaluation." International Journal of Intelligent Engineering and Systems 11, no. 6 (2018): 300-311

U.S. Patent and Published Patent Application Nos. 6785592; 6996517; 7974849; 9135559; 9785715; 10511690; 10684910; 10729502; 10839033; 10853826; 10938828; 11009836; 11074105; 11128589; 11128636; 11165643; 11181872; 11348679; 11366842; 11403000; 11416298; 11436001; 11438289; 11550643; 11550758; 11797102; 11798092; 11798431; 11803358; 11804039; 11816505; 11829953; 11853914; 11856146; 20020087717; 20020194601; 20030110503; 20040215599; 20070008887; 20080091471; 20080201705; 20090271337; 20090299767; 20100011243; 20100223385; 20110066486; 20110295722; 20130013121; 20130110423; 20150167085; 20150205954; 20160049094; 20160100322; 20160110505; 20160188880; 20160199215; 20160239649; 20160307133; 20170053242; 20170124487; 20170137885; 20170206064; 20170228684; 20170232300; 20170236081; 20170251985; 20170255964; 20170300966; 20170308800; 20180001184; 20180053401; 20180078843; 20180096028; 20180129941; 20180129959; 20180137424; 20180243656; 20190042290; 20190102244; 20190110753; 20190113520; 20190196795; 20190253328; 20190253861; 20190349619; 20190361697; 20190377816; 20190377817; 20200004604; 20200005166; 20200045898; 20200050448; 20200059776; 20200067789; 20200084280; 20200099688; 20200105134; 20200106269; 20200126174; 20200134485; 20200210439; 20200237452; 20200250747; 20200251213; 20200252205; 20200273581; 20200274962; 20200279020; 20200306632; 20200319877; 20200321076; 20200349271; 20200364245; 20200380417; 20200410997; 20200410998; 20200411199; 20210056209; 20210060404; 20210063410; 20210073449; 20210082044; 20210097883; 20210142177; 20210142222; 20210142249; 20210182414; 20210182993; 20210203521; 20210247403; 20210313051; 20210313052; 20210319408; 20210342020; 20210342146; 20210342361; 20210342785; 20210342836; 20210350254; 20210373676; 20210374391; 20210397972; 20210399911; 20210400142; 20220019204; 20220038902; 20220046302; 20220066749; 20220075515; 20220091863; 20220165418; 20220172638; 20220172639; 20220172640; 20220180766; 20220180767; 20220198562; 20220230240; 20220277210; 20220277211; 20220342910; 20220351195; 20220366494; 20220375549; 20220379484; 20220383019; 20220386905; 20220398133; 20220398460; 20230048477; 20230065458; 20230087736; 20230098596; 20230117135; 20230117430; 20230117725; 20230117801; 20230118213; 20230118717; 20230119584; 20230121779; 20230123346; 20230123865; 20230124040; 20230124608; 20230124806; 20230129494; 20230130594; 20230131603; 20230157533; 20230173395; 20230185361; 20230186913; 20230187073; 20230196182; 20230196341; 20230206329; 20230206367; 20230214925; 20230245101; 20230259988; 20230266733; 20230268026; 20230274244; 20230274245; 20230294277; 20230316280; 20230317256; 20230319099; 20230335287; 20230351184; 20230351732; 20230398686; 20230418582; 20230419277; and 20230419304.

SUMMARY OF THE INVENTION

Traditional integrated development environments (IDEs) have basic integration points for low-level operations. The extrapolation of required data and analytics for a method according to the present technology use the entry points in a unique way. The raw integration hooks require correlation over the different events, interpretation of the source code, and time-based criteria. For example, when a developer is actively writing code, the editor sends scroll events. Combined with inspection of source code to determine if the source is for a test class, the method requires filtering of events, both based on which projects are enabled for analytics collection as well as time-based events. Like the scenario above, when a developer is coding, most IDEs simply provide a "document changed" event which has the before and after change. To efficiently track edit events across potentially large refactoring operations, interpretation is required to ensure a consistent event metric across disparate IDE integration models. Therefore, more information than a "document changed" event is recorded.

To facilitate data collection, a tailored or customized IDE, that has built in support for rich analytics and task data collection, is provided. Beyond avoiding the user needing to manually install a plug-in, the instrumented IDE can be further optimized for more advanced event filtering and data collection. For example, the IDE could communicate with a data collection microservice to provide the correlated event data for further analysis in the system.

Another aspect of the technology is to track related activities of different developers working on the same code development project. For example, without considering the joint work of different developers, an analysis based on aggregation of statistics from the individual developers only might miss interaction of developers, for example at group meetings and collaborations, in which activities of one developer bleeds over to another developer's portion of a project, outside of the IDE. Similarly, tracking of IDE activity alone does not necessarily reflect the impact of management on the outcome, while integrating management activity with the activity of the respective developers permits a fuller picture to be obtained, with more accurate prediction of status, progress, and outcome.

Since the manager is often more experienced that the developer who is supervised, and may use different automated tools, and may, as appropriate intervene in the coding for analysis, review, testing, and creation, it is advantageous to instrument the manager's tools as well, and to predict project metrics using that information.

In one embodiment, as reflected in FIG. 11, the code development environment connects to a local daemon that is running on the developer's workstation, whether on a local system or in the cloud. The daemon collects the event information and couples it with source changeset data extracted from the local Git repository. The daemon periodically uploads information to a correlation microservice which is responsible for correlating the information across all developers (and managers, as appropriate).

In some cases, the project is on behalf of a client, and the client may be involved in review and testing of the code. The client interface may also be instrumented, since client feedback and especially client issues with performance and implementation may have a significant effect on timelines, including stalls, rework, change of scope, etc.

When analytics information is needed, whether to populate the user interface, or for background activities like pro-active bot-initiated instant messages to the team, the analytics microservice is responsible for processing the collected information. In the context of the predictive model, the analytics microservices are also responsible for reviewing the past work activity to calculate the corresponding baselines that are used for current task analysis.

To populate the user interface, additional data service microservices provide entry points to receive the processed task information, corresponding change set data, and other information presented. For a number of information sets that are stable over time, the data service microservices store calculated information in the database to further optimize future requests.

Therefore, while the instrumented IDE and associated developer information streams based on software developer activity are important for determining the progress of a software development project, other data streams may be integrated as well to provide a more complete picture, as well as inform a predictive model for future projects as to likely deviations from a trajectory based on extrinsic factors.

The present invention provides a system and method for analyzing progress of a code development project, using behavioral analytics to track past progress and a predictive model to estimate future progress. The behavioral analytics review both the code itself, and also interaction of the developer(s) with various resources, to determine a stage of code development, and update predictive metrics based thereon.

The technology covers a method and system by which information about real-time activity can be collected from software developers and leveraged to provide improved workforce monitoring for software teams. By leveraging metrics captured by developers as they are implementing and investigating tasks, a model can be constructed which allows insight into the team performance.

It is an object to provide a method for predicting progress of a code development project, comprising: monitoring behavior of a plurality of software developers through interaction with at least an integrated development environment, the interaction comprising: exploration events comprising browsing source code for understanding or investigation; coding events comprising actively modifying source code; debugging events comprising interacting with a debugger stepping through code in a debugging phase; and testing events comprising coding or running unit tests and test automation; providing a predictive model of the code development project adapted to predict a future status of the code development project; and outputting a prediction dependent on a status of the code development project at a future time.

It is also an object to provide a method for predicting readiness for release of a code development project, comprising: monitoring behavior of a plurality of software developers through interaction with at least an integrated development environment, the interaction comprising: exploration events comprising browsing source code for understanding or investigation; coding events comprising actively modifying source code; debugging events comprising interacting with a debugger stepping through code in a debugging phase; and testing events comprising coding or running unit tests and test automation; determining a progress of the code development project toward release; and outputting a prediction of a time of readiness of the code development project for release dependent on the progress and the monitored behavior. The method may further comprise determining a main branch of the code development project and at least one ancillary branch of the code development project, wherein the prediction of the time for readiness is principally weighted based on tasks within the main branch. The monitoring may be responsive to at least: a time spent of active work on a respective task; a number of file changes; a number of components affected by the file changes; a number of projects affected by the software changes; a number of services affected by the software changes; and a nature of changes with respect to at least added code, removed code, and modified code; and a result of change evolution analysis.

It is an object to provide a method for monitoring a code development project, comprising: monitoring behavior of a plurality of software developers through interaction with at least a code development environment, the interaction comprising: exploration events comprising browsing for understanding or investigation; coding events comprising actively advancing the code development; debugging events comprising inspecting code execution states; and testing events comprising coding or running unit tests and test automation; providing a predictive model of the code development project dependent on the monitored behavior; and generating an output dependent on the predictive model.

It is also an object to provide a non-transitory computer readable medium for performing method for monitoring a code development project, comprising: instructions for monitoring behavior of a plurality of software developers through interaction with at least a code development environment, the interaction comprising: exploration events comprising browsing for understanding or investigation; coding events comprising actively advancing the code development; debugging events comprising inspecting code execution states; and testing events comprising coding or running unit tests and test automation; instructions for providing a predictive model of the code development project dependent on the monitored behavior; and instructions for generating an output dependent on the predictive model.

It is a further object to provide an integrated development environment, comprising: a user interface for a software developer, configured to track: exploration events comprising browsing of preexisting code for understanding or investigation; coding events comprising actively advancing development of code; debugging events comprising inspecting code execution states; and testing events comprising designing or running unit tests of code execution; a monitoring interface, configured communicate the exploration events, coding events, debugging events, and testing events.

The integrated development environment may further comprise a predictive model, configured to receive the exploration events, coding events, debugging events, and testing events from the monitoring interface of each of a plurality of software developers, and to estimate a current state, predict a time of completion or predict a future state, of the code development project.

A still further object provides a server for monitoring a software code development project by a plurality of software developers, comprising: an application programming interface configured to receive data describing exploration events, coding events, debugging events, and testing events from an integrated programming environment for each of the plurality of software developers; at least one automated processor, configured to: aggregate the received data in a database; and implement a predictive model of a state and trajectory of the software code development project over time, to at least estimate a current state, and predict a future state at a respective time of the code development project; and an output port configured to present information dependent on the predictive model. The server may further comprise a user interface, configured to present at least a prediction of a maturity of the software code development project over time. The code development project may comprise a plurality of tasks.

It is also an object to provide a method for monitoring a code development project, comprising: automatically monitoring at least one sequence of actions by at least one code developer during the code development project through interaction with at least one code development environment; predictively modeling at least one of the code development project and the at least one code developer, using an automated adaptive predictive model dependent on the monitored at least one sequence of actions; and updating the automated adaptive predictive model with at least one automated processor.

Another object provides a method for monitoring progress of a code development project, the code development project comprising at least one task, comprising: providing real time data from an integrated development environment for a plurality of software developers; determining exploration events comprising browsing source code for understanding or investigation; determining coding events comprising actively modifying source code; determining debugging events comprising interacting with a debugger stepping through code in a debugging phase; determining testing events comprising coding or running unit tests and test automation; analyzing the exploration events, coding events, debugging events, and testing events to determine a current status of the code development project; and producing an output providing an estimate of at least one of a time to task completion, a time to code development project completion, a code development risk, a code development cost, a code developer efficiency, a code developer productivity, and a code developer improvement.

Another object provides a server for monitoring a code development project by a plurality of code developers, comprising: an application programming interface configured to receive data describing a plurality of different types of code developer activities of the plurality of software developers; at least one automated processor, configured to: aggregate the received data in a database; and implement a predictive model of a state and trajectory of the code development project over time dependent on the database, to at least estimate a current state, and predict a future state of the code development project; and an output port configured to present information dependent on the predictive model.

The method may further comprise at least one of:
updating the predictive model based on an actual subsequent status of the code development project;
maintaining a developer-specific profile for each software developer, wherein the predictive model is code development project staffing-dependent;
visualizing a developer-specific daily work performance;
determining a work level of each software developer; and visualizing the work level of each software developer;
determining a work level of each software developer; and providing a supervisor visualization interface reflecting the determined work level of each software developer;
analyzing risks of the code development project;
visualizing the analyzed risks;
suggesting improvement opportunities to accelerate completion of the code development project;
suggesting improvement opportunities to reduce risks of the code development project;
suggesting a mentoring opportunity for at least one software developer by at least one other software developer;
determining a risk in the code development project and suggesting a mentoring opportunity for at least one software developer to mitigate the risk;
determining a risk inherent in the behavior of a software developer, and suggesting a change in behavior of the software developer based on the determined risk;
determining a risk inherent in the behavior of a software developer, and mentoring the software developer to alter the behavior of the software developer;
determining a risk inherent in the behavior of a software developer, and issuing an alert to a mentor selectively in dependence thereon;
estimating a current state of the code development project;
providing a real-time output of the estimated current state of the code development project;
extrapolating a code development project pattern based on the task complexity and an associated risk for each respective task;
presenting at least one visualization of the code development project pattern;
determining an efficiency of a respective software developer based on the at least the code development project pattern;
determining an efficiency of the plurality of software developers based on the at least the code development project pattern;
building out a baseline for regular developer activities during code development over a series of code development projects, and modifying the baseline dependent on actual code development project progress.
altering a staffing of software developers in dependence on the prediction;
producing an alert based on activity of a respective software developer;
producing an alert based on a determined risk of a task of the software development project;
producing an alert based on a determined complexity of a task of the software development project;
altering a staffing of software developers on the code development project in dependence on the prediction;
automatically populating an engineering time in a task tracking system;
determining a safety of a change to the source code, wherein the safety may be is determined based on at least a number of coding events, an impact on source code dependencies, and amount of at least one of exploration events and debugging events prior to commencement of a coding event, an amount of testing events with respect to a change size; and determining a risk of a change to the source code, wherein the risk may be determined based on at least a size of a code change with respect to a predicted code freeze, an amount or duration of exploration events, a sufficiency of testing events with respect to a size of a code change, and an amount of code churn.

The code development project may comprise a plurality of tasks, further comprising at least one of:

estimating a task complexity for each respective task;

determining a task complexity for each respective task, wherein the prediction is further dependent on the determined task complexity for at least one task;

determining a task complexity for a task-in-progress, wherein the prediction is further dependent on the determined task complexity;

determining a task complexity for at least one completed task, wherein the prediction is further dependent on the determined task complexity;

The outputting of the prediction dependent on the status of the code development project at the future time may comprises forecasting a release date. The method may further comprise determining a confidence or confidence range of the forecast release date.

The code development project may comprise a plurality of tasks, wherein the predictive model is responsive to a task complexity for each remaining respective task.

The prediction may be dependent on at least a concurrent second code development project.

A per-code development project profile may be maintained for each source code repository, wherein the predictive model is code development project-dependent.

A user interface may be provided configured to permit a project administrator to review and modify the predictive model's values from a baseline state, to influence control over expected work patterns used during task analysis.

The monitoring of behavior of the plurality of software developers through interaction with at least the integrated development environment may comprise installing a software plugin to the integrated development environment that tracks interactions, and aggregates statistics for different types of interactions, or instrumenting the integrated development environment to track interaction with each software developer, or tracking interaction with each software developer.

The code development project comprises a plurality of tasks, further comprising building a risk assessment for respective tasks based on tracking of task assignments to respective software developers and active task development by respective software developers.

The monitoring of behavior may comprise determining a directness of software development; determining an amount of time a respective software developer spends exploring before coding; determining a churn rate on code that gets committed; determining a size of a code change set produced by a respective software developer; determining code iterations during a task of the code development project; determining debug/code cycles during a task of the code development project; determining a proportional time in a testing cycle of a respective task having a change size relative to other tasks with similar change size, wherein the code development project comprises a plurality of tasks; determining a quantity of a change to at least one dependency with respect to predicted time before release of the code development project; monitoring coding events related to keystrokes in project source code files; monitoring debugging events related to using breakpoints, stepping through code, and actions related to diagnosing a behavior of code; monitoring exploration events related to scrolling through different source code files; monitoring exploration events distinct from coding events, testing events, and debugging events; monitoring exploration events and debugging events prior to commencing coding; monitoring exploration events and debugging events prior to commencing coding; or monitoring: coding events related to keystrokes in project source code files, debugging events related to using breakpoints, stepping through code, and actions related to diagnosing a behavior of code, exploration events related to scrolling through different source code files, and exploration events distinct from coding events, testing events, and debugging events.

The prediction may comprise an aggregate of an estimated task time for each respective task.

The coding events may comprise:

impacted common functions which capture a number of references to changed functions in the source code modified as part of a respective task;

a change size which captures a complexity of a final implementation of a respective software developer task based on characters of code impacted; or a determination of a dependency impact which captures a number of dependency changes introduced by implementation of a respective task.

The monitoring may comprise determining a file churn index representing a frequency of change to files in a source code repository relative to other files in the source code repository.

The coding events, exploration events, debugging events, and testing events may be automatically distinguished.

It is another object to provide a method for monitoring progress of a code development project, the code development project comprising at least one task, comprising: providing real time data from an integrated development environment for a plurality of software developers; determining exploration events comprising browsing source code for understanding or investigation; determining coding events comprising actively modifying source code; determining debugging events comprising interacting with a debugger stepping through code in a debugging phase; determining testing events comprising coding or running unit tests and test automation; analyzing the exploration events, coding events, debugging events, and testing events to determine a current status of the code development project; and estimating a time to task completion within the code development project.

The method may further comprise interfacing the integrated development environment with a task tracking system.

The task tracking system may comprise Jira, Kanban-based system, Scrum-based system, bug defect tracking system, or other task tracking platform.

The method may further comprise providing real time data from an active code repository; and the providing real time data from an integrated development environment comprises automatically tracking developer activity in the integrated development environment to update the at least one task.

The method may further comprise proving an application which interfaces with the integrated development environment using an application programming interface to provide real-time monitoring of the plurality of software developers.

The code development project may employ a plurality of code developers, and the predictive modelling may be of the at least one code developer, wherein a separate profile is maintained for each respective code developer.

The predictive modelling may be of the code development project, and the method further comprise using the automated adaptive predictive model to estimate a temporal aspect relating to project completion.

The code development project may employ a plurality of code developers, the predictive modelling is of both the plurality of code developers and the code development project, and the method further comprising using the automated adaptive predictive model to optimize staffing of the code development project by a subset of the plurality of code developers.

The monitoring of at least one sequence of actions by at least one code developer may comprise monitoring exploration events comprising browsing for understanding or investigation, and coding events comprise actively advancing the code development.

The monitoring of at least one sequence of actions by at least one code developer may further comprise monitoring debugging events comprising inspecting code execution states, and testing events comprise coding or running unit tests and test automation.

The automated adaptive predictive model may be updated to reduce a prediction error with respect to at least one of respective code developer activity, code developer productivity, code development project progress, and code development project risks.

The automated adaptive predictive model may be further updated to reduce an error in predicting a slippage of at least one release.

The method may further comprise generating a graphic visualization of at least one of a code developer activity, a code developer productivity, a code developer efficiency, a code developer proficiency, a code development project progress, a code development project risk, and a code development project completion.

The method may further comprise determining a time and resource cost function, and outputting at least one proposal for at least one of cost efficiently increasing a speed of completion of the code development project and decreasing a risk of the code development project.

The method may further comprise determining a risk in the code development project and producing an output comprising a suggested mentoring opportunity for at least one software developer to mentor at least one other software developer to mitigate a code development project risk.

The method may further comprise determining a risk inherent in a behavior of at least one code developer, and mentoring the software developer to alter the behavior of the software developer.

The code development project may comprises a plurality of tasks, each respective task having a task complexity, and the automated adaptive predictive model may be further dependent on the task complexity of the plurality of tasks, the method further comprising predicting a progress of the code development project using the automated predictive model dependent on a complexity of incomplete tasks.

The automatic monitoring of the at least one sequence of actions by at least one code developer during the code development project may comprise instrumenting or installing a software plugin to the at least one integrated development environment (IDE) that tracks interactions, and aggregates statistics for different types of interactions. The technology also encompasses the instrumented the IDE.

The at least one code developer may comprise a plurality of code developers, and the code development project may comprise a plurality of tasks, the method further comprising building a risk assessment for respective tasks based on tracking of task assignments to respective code developers and active task development by respective code developers.

The code development project may comprise a plurality of tasks having dependencies, and the automatic monitoring of at least one sequence of actions by the at least one code developer may comprise monitoring coding events, the method further comprising determining a dependency impact which captures a number of dependency changes introduced by implementation of a respective task.

The method may further comprise automatically populating an engineering time in a time system.

The automatic monitoring of the at least one sequence of actions by at least one code developer during the code development project may comprise: monitoring coding events comprising a change size which captures a complexity of a final implementation of a respective code developer task based on characters of code impacted; determining a file churn index representing a frequency of change to files in a source code repository relative to other files in the source code repository; or automatically distinguishing between coding events, exploration events, debugging events, and testing events by a respective code developer.

The method may further comprise determining a risk of a change to source code within the code development project. The risk may be determined based on at least a size of a code change with respect to a predicted code freeze, an amount or duration of exploration events, a ratio or time of different types of development activities, a sufficiency of testing events with respect to a size of a code change, and an amount of code churn.

The automatic monitoring may be responsive to at least: a time spent of active work by a code developer on a respective task; a number of file changes; a number of components affected by the file changes; a number of projects affected by the software changes; a number of services affected by the software changes; a nature of changes with respect to at least added code, removed code, and modified code; and a result of change evolution analysis.

The method may further comprise providing real time data from an active code repository; and the providing real time data from the integrated development environment may comprise automatically tracking developer activity in the integrated development environment to update the at least one task.

The method may further comprise determining a progress of the code development project toward release; and outputting a prediction of a time of readiness of the code development project for release dependent on the progress and the determined the exploration events, coding events, debugging events, and testing events.

The method may further comprise determining a main branch of the code development project and at least one ancillary branch of the code development project, wherein the prediction of the time for readiness is principally weighted based on tasks within the main branch.

BRIEF DESCRIPTION OF THE DRAWINGS

FIGS. 8A and 8B show screen shots representing an overview of the team from the engineering perspective and a details for team member, respectively.

FIG. 12 shows a flowchart according to a second embodiment of the invention.

FIG. 13 shows a flowchart according to a second embodiment of the invention.

FIG. 14 shows a flowchart according to a second embodiment of the invention.

FIG. 15 shows a flowchart according to a second embodiment of the invention.

DETAILED DESCRIPTION OF THE PREFERRED EMBODIMENTS

Figure 1:
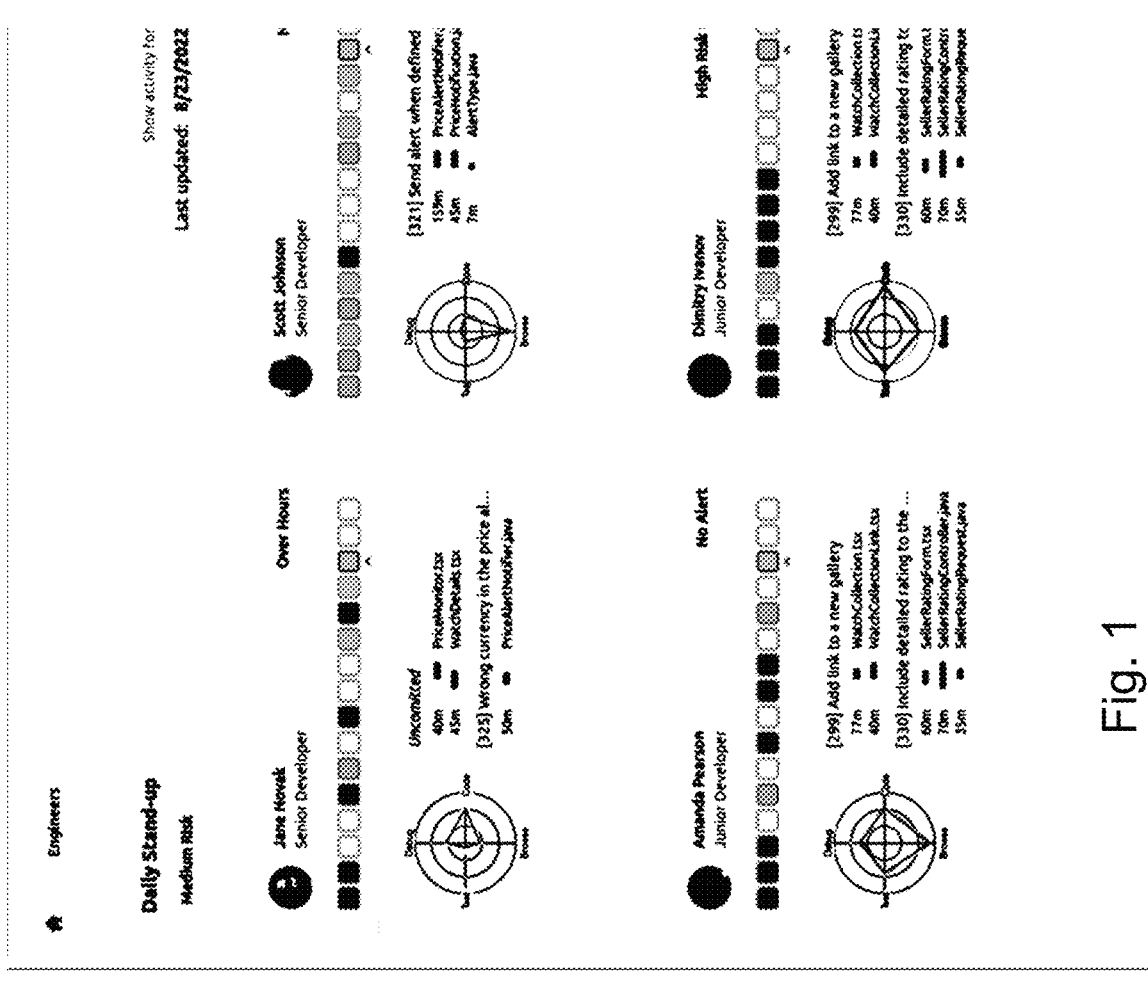
FIG. 1 shows a "Daily Stand-up" screenshot, indicating time spent by an engineer daily in the context of a given project.

Unlike existing solutions which rely on a static data collected from the control version systems or task manager tools, this method allows manager to monitor the activity continuously over the whole process of working on a task.

In accordance with a preferred embodiment, the process:
1. Tracks Task Activity

Track low level activity inside IDEs of developers/engineers on the team
2. Analyzes Task Complexity For each task, create a task assessment including complexity and risk
3. Extracts Trends Extrapolate project patterns based on task complexity and risk The technology may further visualize patterns, to provide alerts, projections and reports. The patterns detected can be used to improve team efficiency.

The data may be used for:

Release Forecasting

Prediction risks should reduce towards release, increasing confidence on date. The use of task complexity assessments in combination with assessment of remaining tasks for the release, provide a basis for a projection best/worst and likely dates.

Task Estimation Feedback

By using the actual engineering time captured for a task, this system provides a feedback loop, to improve team-level reports on planning accuracy to give managers a better insight into how a team is projecting tasks. The captured "actual engineering time" for each task can be integrated with task tracking systems for greater visibility between estimated and actual work efforts. The technology may be applied to individuals, teams and larger groups.

Technical Mentoring

The system and pattern of data collected can be used to provide insights for a mentor including timely alerts on odd behavior (e.g., using most of the assigned task time for an issue but still only in the exploration stage). In addition, the data collection can provide suggestions for improvement such as if the team generally uses the debugger but an engineer proportionally does not.

Employee Monitoring

Using the activity tracked from the integrated development environment (IDE), an efficient management of remote employees can include alerts for when a team productivity changes disproportionately from a team member, if an employee stops doing work, as well as provide insights into daily work levels.

Inside each IDE for engineers on the team, a small plugin/extension is installed that can track interactions, and aggregated statistics of different types of interactions. These actions are categorized to allow extrapolation of work activities. The following is an exemplary categorization of types of activities.

Exploring Browsing source code for understanding or investigation

Coding Actively modifying source code

Debugging Interacting with the debugger stepping through code

Testing Coding or running unit tests and test automation

By tracking task assignments and active task, the activity tracked is used to build a risk assessment for tasks. Conceptually this can be broken down into different risk values. The labels here are used for exemplification only, and are not limiting:

Directness (or Inverse of Uncertainty)

A proportionally low amount of time exploring before coding

+ a low churn rate on the code that gets committed

Complexity

The size of the change set produced

+ the code iterations (debug/code cycles) during the task

Unit Tested

A proportional time in the testing cycle relative to other tasks with similar change size Regression Risk A relatively large change or changes to dependencies given the time before release There are numerous approaches for managing software releases, from bug tracking software to Kanban-style card management. The technology may provide an input of high-fidelity data that can be used in other systems. For instance, this method can be used to automatically populate engineering time in other time or task tracking systems. In addition, this solution can be integrated with external systems to provide communication and alerts via platforms such as Slack and Microsoft Teams.

The technology provides a method and system by which real-time metrics can be collected from software developers or other productive employees, and leveraged to provide improved project estimation and release forecasting. By leveraging metrics captured by developers as they are implementing and investigating tasks, a model can be constructed which allows insight into the project risk, complexity and planning accuracy of the activity. Using this data model, algorithms may be implemented which allow high fidelity forecasting for project releases and iterative improvement in the test estimation planning of tasks.

Unlike existing systems which rely on human provided activity data or by low granularity data such as how long a development task is in a given state of its work cycle, this data collection is fully automated by leveraging extensibility hooks in the integrated development environment (IDE) of software developers. By using real data collected inside the IDE, access to data currently not leveraged in project planning systems for software teams is exploited.

Data Collection

The data collected can be broken into four core categories of activity which are then analyzed by the algorithms described below.

Categories of live events collected:

Coding events (CE) related to keystrokes and similar development activities in project source code files.

Testing events (TE) related to keystrokes in test source files and invocations of test suites inside the IDE.

Debugging events (DE) related to using breakpoints, stepping through code, and other actions related to diagnosing the behavior of source code.

Exploration events (EE) related to scrolling through different source code files and functions outside of other CE, TE or DE activities.

Additionally, EE and DE events prior to fully coding event commencement are captured as (EEbC) and (DEbC) respectively.

Additional task metrics collected:

Estimated Task Time (ETT) is the time the team estimated that the task would take.

Total Task Time (TTT) captures the total active time to implement the task including CE, TE, DE, EE events.

Change size (CS) captures the complexity of the final implementation of the developer task based on characters impacted (additions, and removals).

Impacted common functions (ICF) captures the number of references to changed functions in the source code modified as part of the task.

Dependency impact (DI) captures the number of dependency changes introduced by the task implementation.

Time to planned Code Freeze (TCF) is the planned time remaining before code is frozen and stable Average Code Freeze to Release (CFtR) is the historic time between code freeze and release for the project team File Churn Index (FCI) is the frequency of change to files in the repository relative to other files.

Average Coding Events (ACE) is the average coding events for tasks in the given release cycle.

Average New Daily Tasks (NDT) is the exponential moving average for new tasks added daily in the recent release work.

The collection of this data into a structured model allows insights into the behavior and complexity of work activities. By automatically analyzing this data, a number of interesting scenarios can be detected and used to improve accuracy of project and test estimation.

Exemplary Scenarios

As an example, the following behaviors exhibit these patterns:

A "safe" change would typically have:

A known change by the developer
similar number of CEs relative to CS

No or small impact to project dependencies
zero or low DI

Appropriate amount of exploration or debugging to find fix
comparatively small DE and EE prior to CE start Appropriate amount of testing for the change
elative TE to CS size
increased TE if changing ICF A "high risk" change may have any of the following:

Large change close to code freeze
large CS relative to TCF

Heavy investigation required to start coding
extended DE or EE before CE start

Insignificant testing for change
large ICF or DI without extensive TE
Zero or low TE relative to CS for team High churn fix with multiple attempts by developer
large CE relative to smaller CS Summary of Algorithm The present technology builds a Task Risk Value (TRV) for each task which allows a Project Stability Value (PSV) to be extrapolated for recently worked on tasks. In addition, the real-time events being collected can be used to further calculate a Current Activity Level (CAL). The combination of the PSV, remaining work tasks and CAL is used to build a Release Confidence (RC). The RC is similar to forecasting projections for a hurricane hitting landfall where the smaller the TCF is, the more accurate the release projection will become.

Teams leveraging this algorithm benefit from a clear understanding of the minimum project time to release, as well as both a likely time to release and a worst case estimation. Early in the development cycle there is inherently greater uncertainty. Beyond forecasting, the TRV enables development teams to understand the risk related to proceeding with a given task, such as adding extra testing or extending the cooldown between code freeze and release.

During periods with high risk tasks, management may deem it appropriate to schedule additional resources to be available, while during periods with low risk tasks, resources may be constrained to a near minimum per the task completion model. Note that at any time, there may be many tasks concurrently underway, and the overscheduling of resources may be determined based on the aggregate statistical risks of the tasks, as well as the risk tolerance of management to delay in project completion.

Task Risk Analysis

To calculate the projected release date, the following algorithm is used based on the metrics above.

The algorithm inputs are calculated by using live events to build a weighted risk value for each element. The exact weighting algorithm can vary in the implementation of the method, however, the following equations are included as examples.

Appropriate time exploring/debugging before coding commences
Investigation before Coding (IbC)

$$IbC = \max\left(0, \left((EEbC + DEbC)/CE\right) - 1\right)$$

An investigation of equal or smaller length than the coding is a 0 risk. An initial investigation three times longer than coding is a 2 risk.

Appropriate number of edits compared to characters in change set
Edits vs Size (EvS)

$$EvS = (CE/CS - 1)/2$$

A perfect change of 100 characters typed for a 100 character change is a 0 risk. A high churn change of 1,000 characters typed for a 100 character change is a 5 risk.

Appropriate testing performed given code size
    Tests vs Size (TvS)

$$TvS = (TE == 0 \ ? \ 3{:}0)$$

Require tests to be run as part of the task. As test suites may already exist, simply give credit for running tests.

Actual time for task relative to estimated time
    Time vs Estimate (TvE)

$$TvE = \min(10, \max(0, ((TTT/ETT) - 1)) * 3)$$

A task that takes the same or less than estimated time is a risk of 0. A task that takes double the estimated time is a risk of 3.

Changes to files that are continually updated by the team
    Impact to High Churn Files (IHC)

$$IHC = 10 * (linesChangedIn(\text{changes}, FCI)/CS)$$

A change that impacts only high churn files would be a risk of 10, whereas a change with minimal impact to high churn files is close to 0.

Changes to functions called by many places
    Common Functions Impacted (CFI)

$$CFI =, \min(5, ICF) * 2$$

A change that impacts 5 or more common functions will have a risk of 10, whereas a change with no impacted common functions has a risk of 0.

Dependency impacting changes with potential ripple to stability
    Dependency Change Risk (DCR)

$$DCR = \min(2, DI) * 5$$

A change that impacts 2 or more dependencies will have a risk of 10, while a change to 1 dependency is a risk of 5.

Large change approaching code freeze date
    Large Change near Release (LCR)

$$LCR = \max(10, \min(0, (CE/(ACE * 0.7) - 1)) * \max(0, 10 - TCF)))$$

Early in the release cycle has no added risk by larger changes. But a change that is within the last 10 days before code freeze has an increasing risk as changes approach the average change size. The 10 day window is configurable by teams.

Development Environment Integration

To integrate with development environments (IDE), the technology involves leveraging extensibility frameworks of IDEs to contribute an extension that developers install. This extension leverages APIs to monitor real time activity by the developer. Using a SaaS integration with the task tracking system of the team, the extension has knowledge of the current task assigned to the developer and can automatically collect metrics data under the task's identifier.

If there are multiple currently assigned tasks, the system allows automatic extraction of the task identifier from the change record submitted as part of the source modifications for the task or allows the extension to prompt the user if the information is not able to be automatically extracted.

For each IDE, the approach varies based on the available APIs, however, activities can be grouped into the CE, EE, DE, and TE buckets automatically by the extension. The EEbC and DEbC involve additional state to recognize when CE activities have started and this information can be tracked either on the local system or via services on a backend to facilitate this coordination. The File Changes (FC) data is collected by creating a local snapshot of a file prior to its modification and then periodically generates delta files stored locally. The snapshot and deltas are then used to generate aggregated information about changes in a given file.

The average number of events in each category (CE, TE, DE, EE) is analyzed on a per-repository (e.g., Github) bases. For example, using a rolling average over the last 4 weeks, a "usual" amount of CE, TE, DE and EE may be extrapolated for each task. If the average CE is 1,000 and the average DE is 50, this can be expressed as a ratio. So, a task that has 1000 DE and 1000 CE would have an adjusted weight of DE 20.0 and CE 1.0. Thus the amount of debug is significantly higher than coding events. As each team is different, by basing this on a per-repository basis, the values may be normalized for different types of work in an organization as work patterns differ by project.

All of the CE, DE, TE, and EE events are captured in the context of a repository/file path. In the backend, when activity events are received for a given file, the total activity per file is incremented in a table. This allows identification of which files have the highest iteration.

The same activity of events per file allows use of metrics on a per-task basis to report not only the size of changes in each file, but where the file changes were made.

Metrics are collected on a backend aggregator that coalesces information from a developer's potential various physical devices as well as across development teams. Using the collected metrics, the technology uses a rolling average and peak task risks based on the Task Risk Value (TRV) to calculate the overall Project Stability Value (PSV).

Workforce monitoring is broken down into two parts: monitoring with the goal to provide mentoring, and to provide supervision (productive outputs).

FIG. 1 shows a "Daily Stand-up" screenshot, indicating time spent by an engineer daily in the context of a given project. From the monitoring, we technically know precisely how long someone was working in the IDE, but for current reports that is not shown. Instead, the visualization for management focuses more on the general relative work and flow of the team. This dashboard represents a combination of variations between peers and injected insights.

Figure 2:
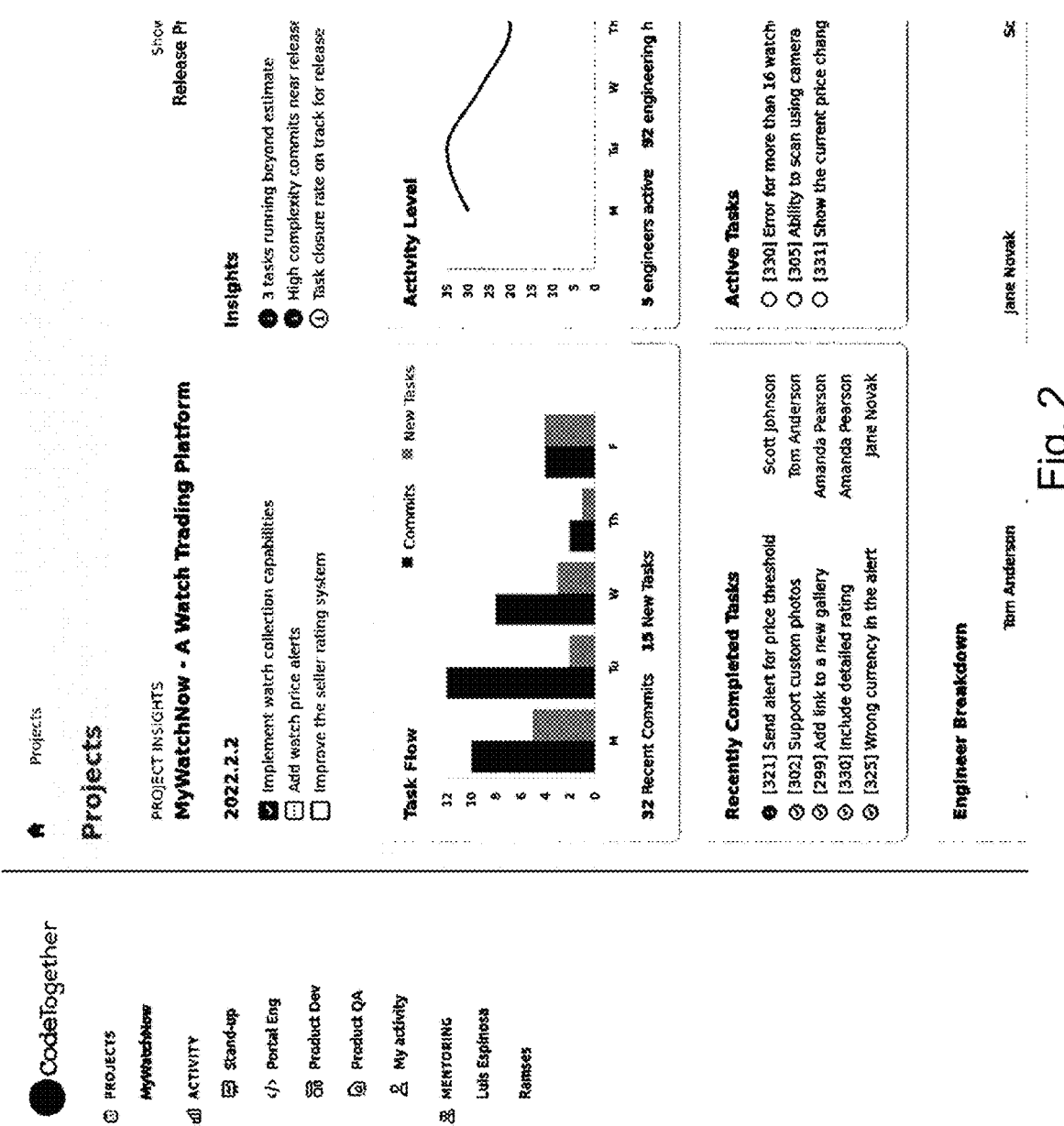
FIG. 2 shows a "MyWatchNow" project dashboard, showing at a higher level view of how activities are flowing.

FIG. 2 shows a "MyWatchNow" project dashboard, showing at a higher level view of how activities are flowing, including insights like "3 tasks running beyond estimate". This pulls together a risk analysis of cards in context, with the overall flow of work. Management can get a sense of the activity flow of work, and the Engineer Breakdown provides a graph per engineer of their work effort.

Figure 3:
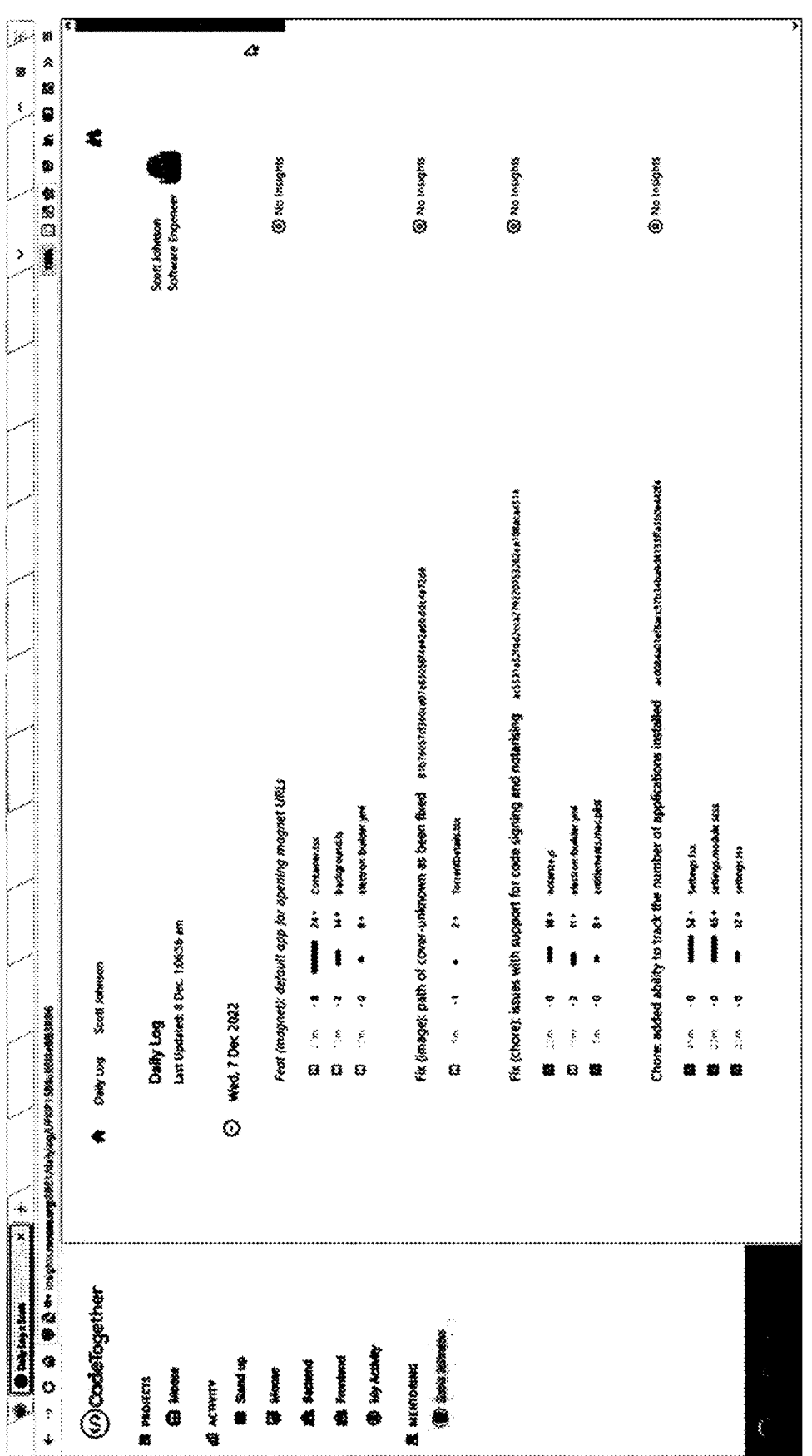
FIG. 3 shows a screenshot of a user interface allowing the viewer to look at the files worked on by day (selecting the activity box at the top of the engineer's card) and the time per file beyond the change size, broken down by commit/tasks.

FIG. 3 shows a screenshot, demonstrating how a viewer can look at the files worked on by day (selecting the activity box at the top of the engineer's card), showing the time per file beyond the change size, broken down by commit/tasks.

From the project level graphs, both broken down by engineer and overall project work flow, patterns of activity can be seen and analyzed.

The integration with the task management system permits determination of when releases went out and the associated tasks for a release, permitting calculation of risk scores for tasks going into the release, and comparison from the Code Complete Date to the Release Date and building of a baseline of time from code complete to release. This allows extrapolation of future releases based on recently complexity tasks and number of tasks remaining.

One embodiment for use of this information is by enabling the integration with an external task management system, e.g., Jira or Kanban. In those systems, the expected time for a task may be logged, which is an input to the present technology. When commits related to the task are detected (commits can be associated back, based on identifiers in the commit subject), the actual engineering time spent on a task can then be populated and updated back into the task tracking system.

This allows use of both reports in those systems as well as alerts from the present system. For instance, in the Project screenshot (FIG. 2) an alert appears next to "Send alert for price threshold" under recently completed tasks. The graphical user interface provides that if the pointing device hovers over that task, it can provide information on that task alert. In addition, under Insights, it says "3 tasks running beyond estimate". Hovering on this gives details on which tasks are taking too long.

This allows natural usage where a developer is already working (like Jira/Kanban) as well as provide complementary insights in a private portal.

Figure 4:
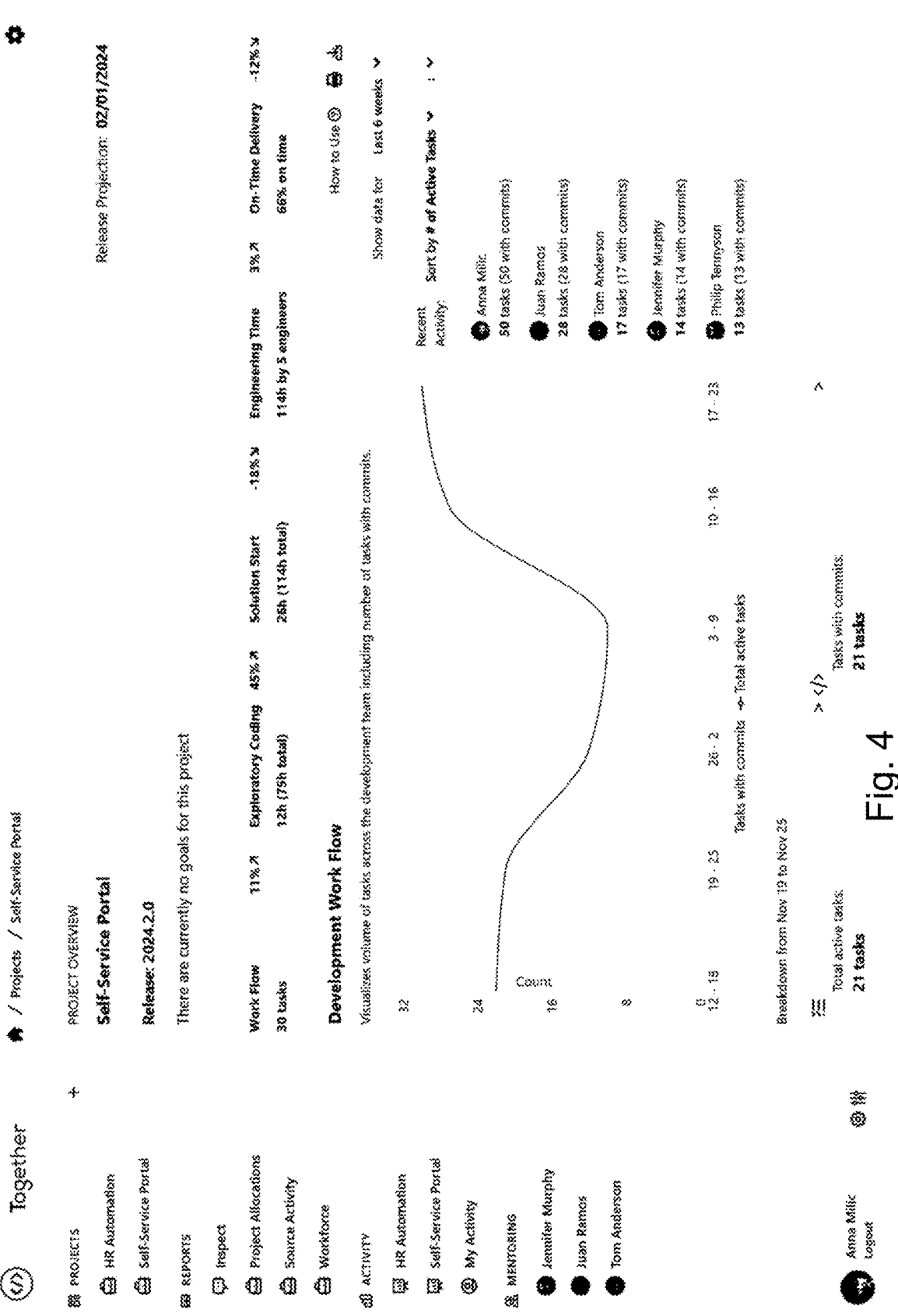
FIG. 4 shows a screen shot representing Development Code Churn.

FIG. 4 represents the Development Workflow, and shows the work done by the team over time visualizing the work distribution across engineers.

Figure 5:
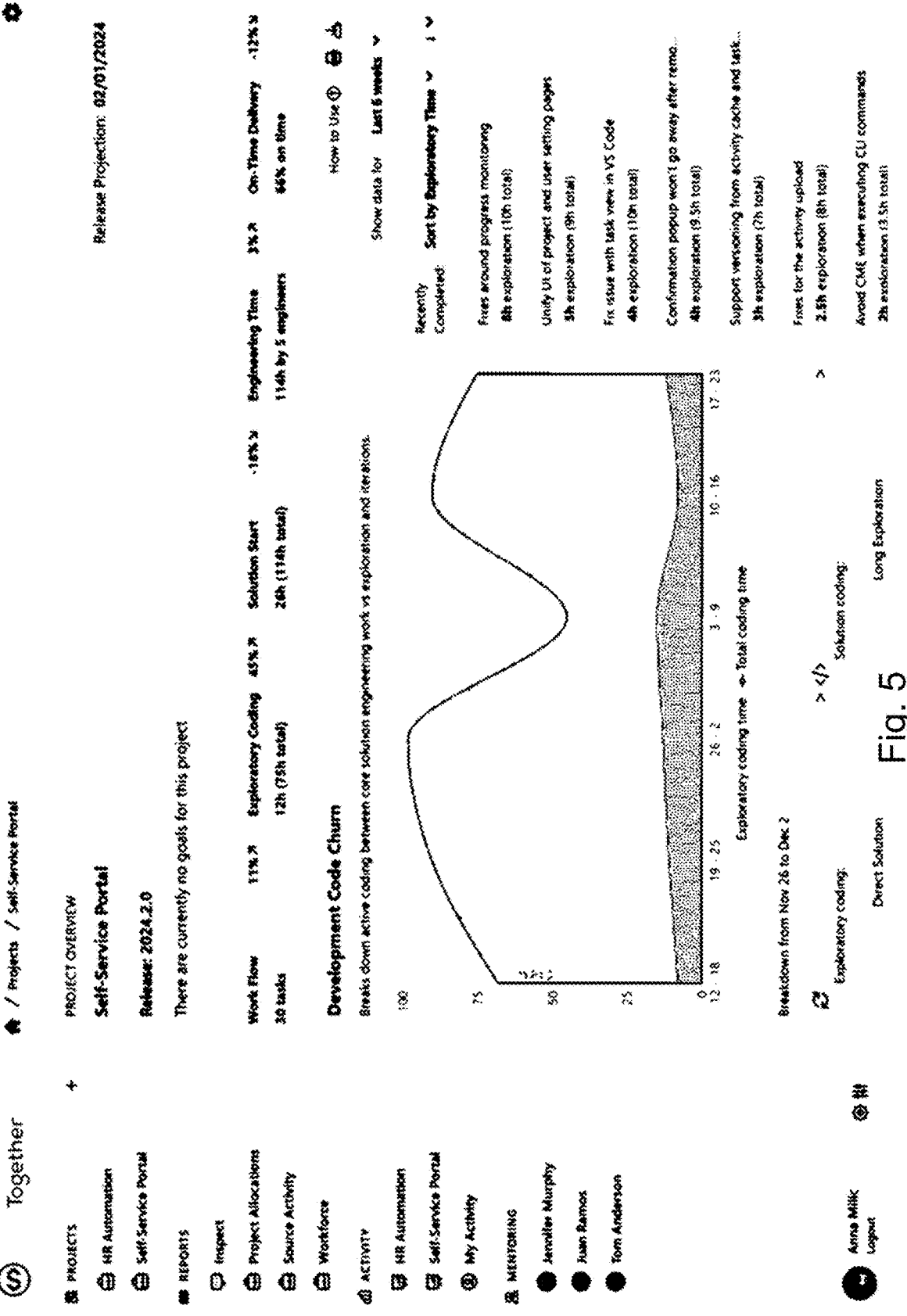
FIG. 5 shows a screen shot of a focused engineering time report.

FIG. 5 shows the Development Code Churn, visualizing the distribution of work breaking down exploratory coding vs. total coding time. The drill-down on the right helps teams understand where time is being "lost" due to things like lack of requirement clarity and developers iterating on work, such as seen by the 8 hours of exploration for a 10 hour total task. This uses logic from the task tracking to automatically calculate time distributions using behavioral activity from the developer.

Figure 6:
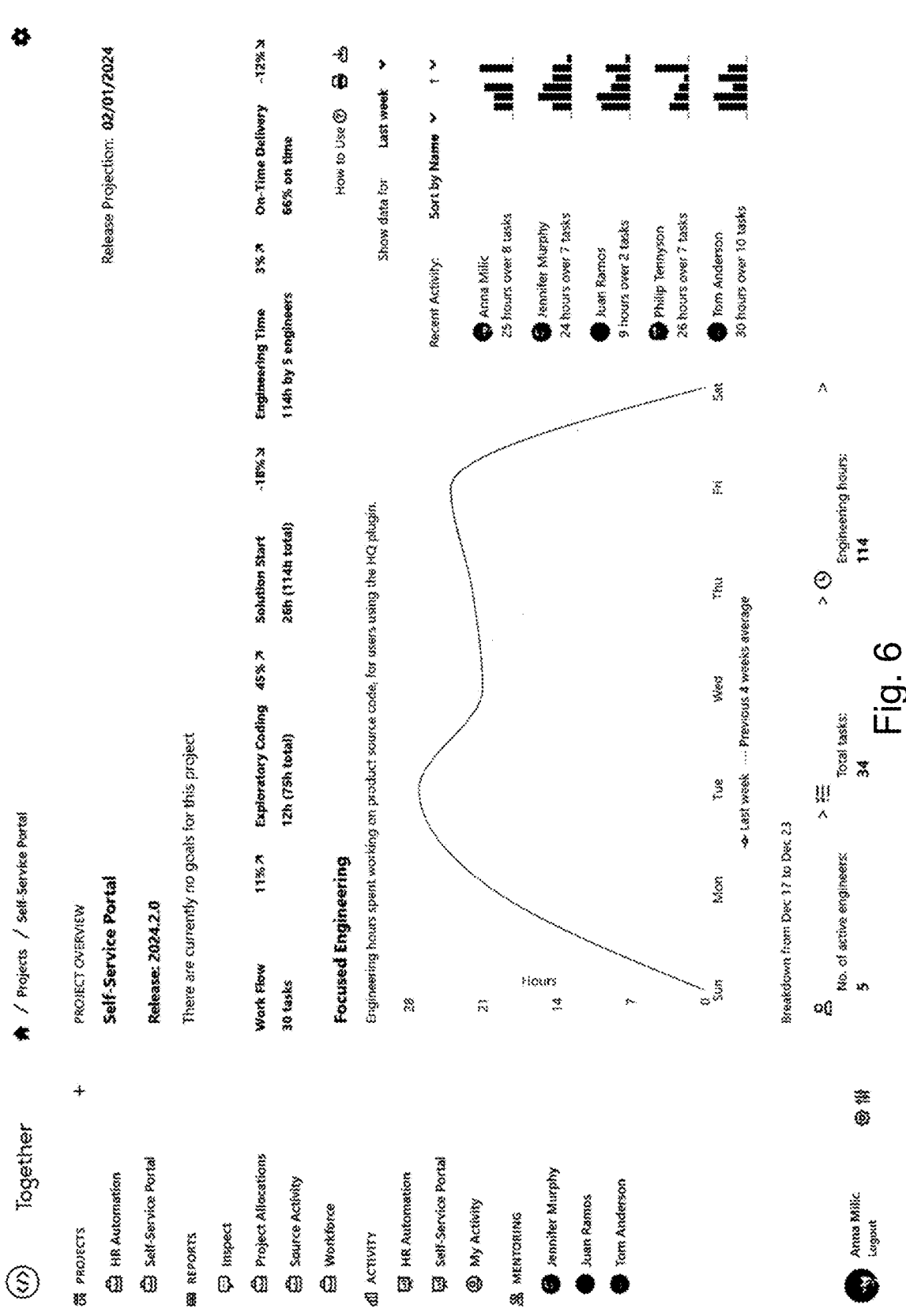
FIG. 6 shows a screen shot which represents integrations with external systems.

FIG. 6 shows a focused engineering time report which visualizes the time tracked by the system for developers and allows viewing in different time periods. It provides insights into general team activity levels.

Figure 7:
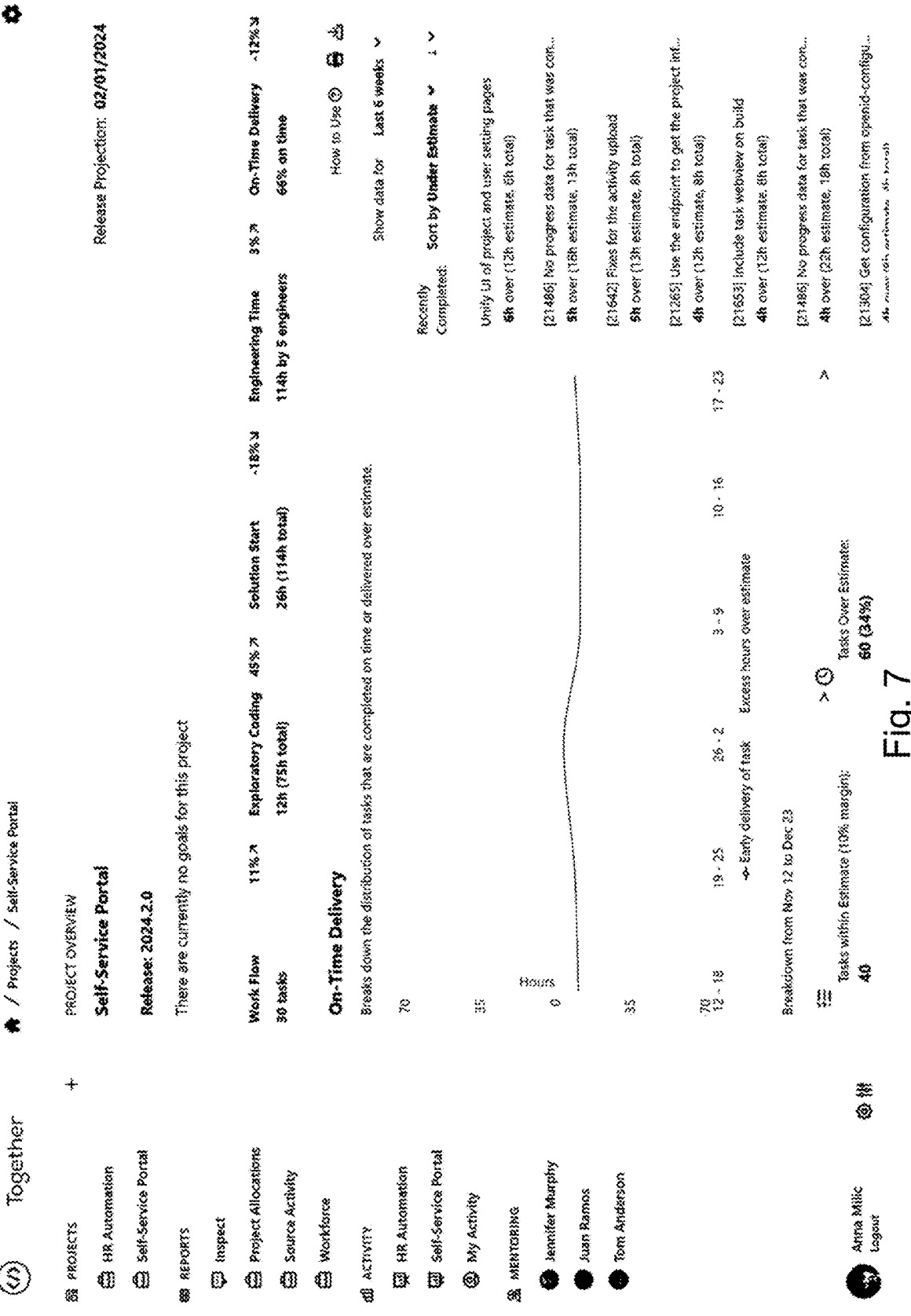
FIG. 7 shows a screen shot representing the developers and areas for opportunity.

FIG. 7 presents a screen shot of integrations with external systems, in this case Jira, to track the time developers actually spent on tasks vs. the estimated time originally planned in Jira. Times are then provided back to Jira to help with future estimations. An artificial intelligence (AI) system, using a large language model, similar to ChatGPT, may be employed using AI to automatically process task descriptions against overages to improve accuracy of future estimations including project release/sprint forecasting and planning.

Figure 8B:
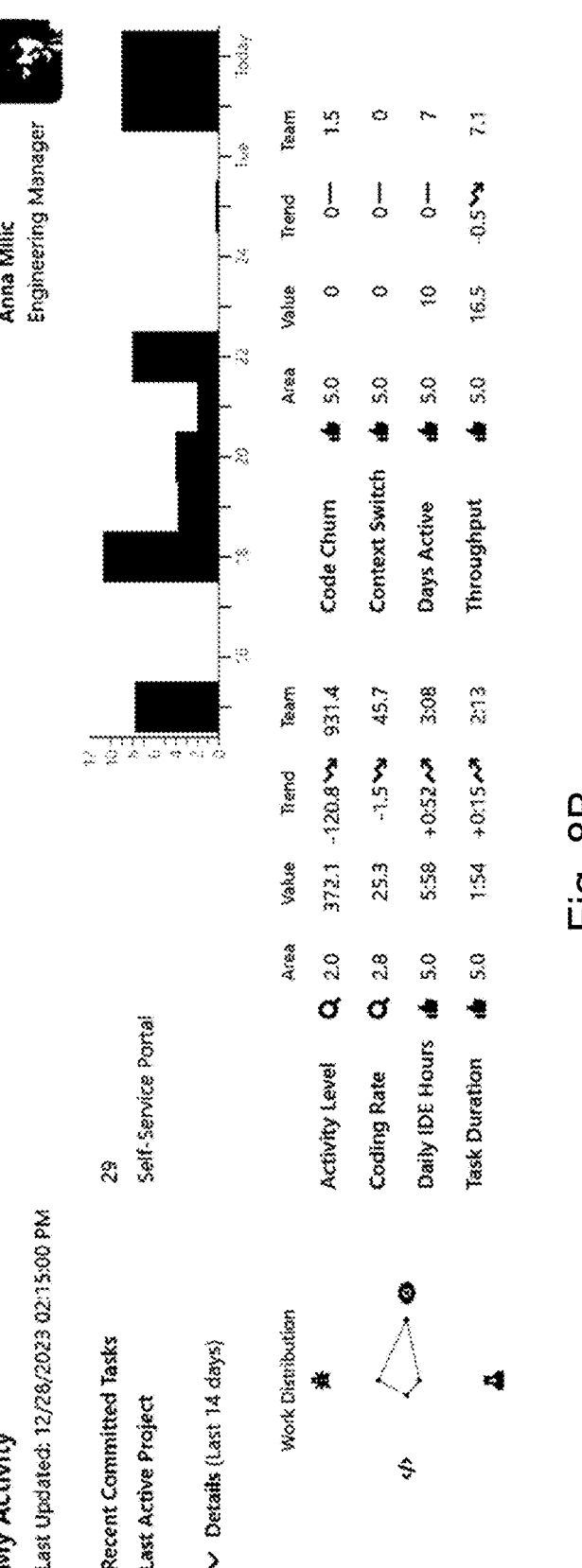

FIG. 8A provides a screen shot of a visualization of the developers and their respective areas for opportunity, such as Anna is low on her daily hours (you can drill in to get that data) or that Philip and Tom have high code churn. A number from 0-5 is used as a rating with 5 being good. The rating may be further elaborated as shown in FIG. 8B by drilling in to see specific numbers on a developer.

Figure 9A:
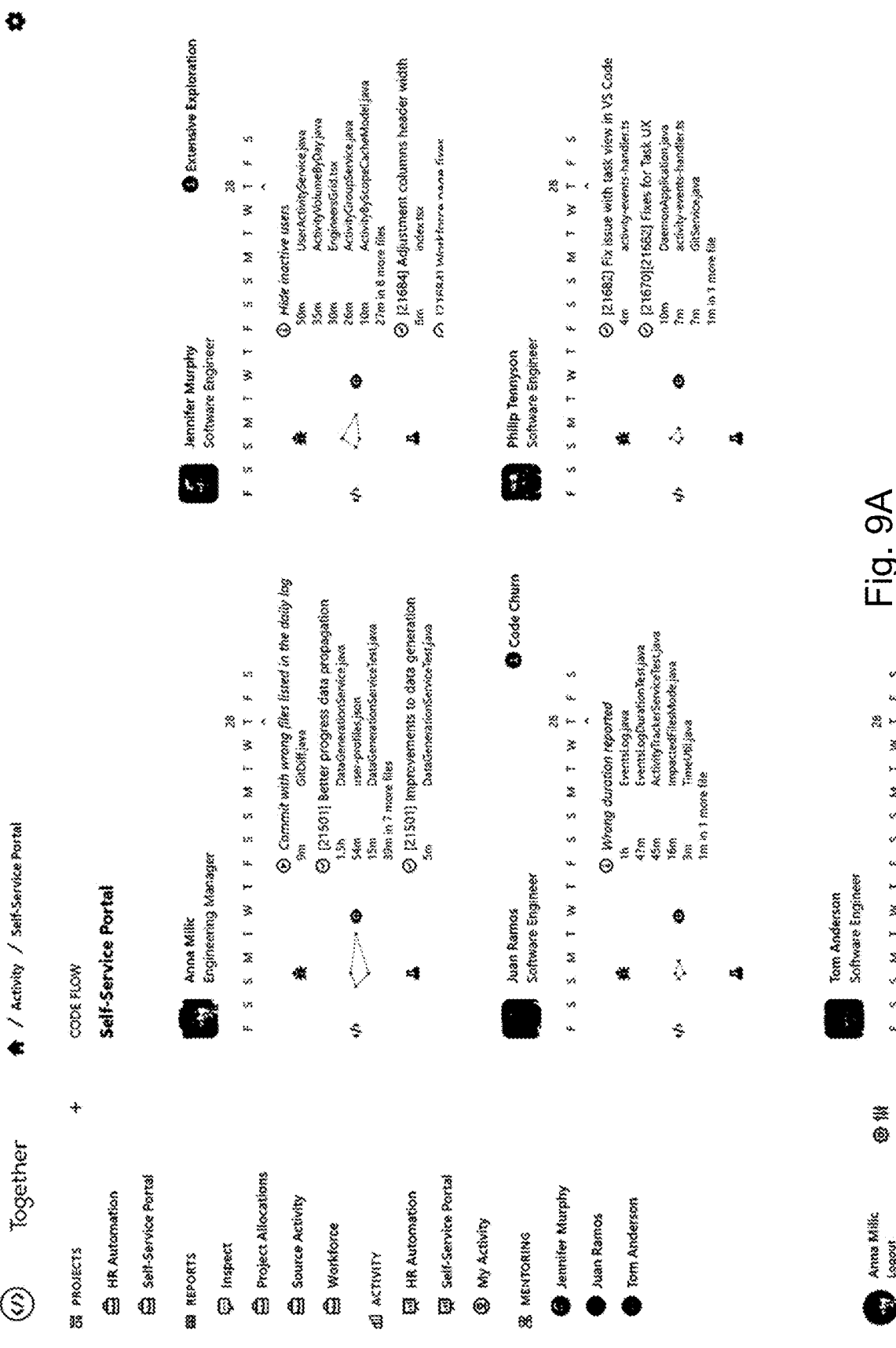
FIG. 9A shows an overview of the team from the engineering perspective.
Figure 9B:
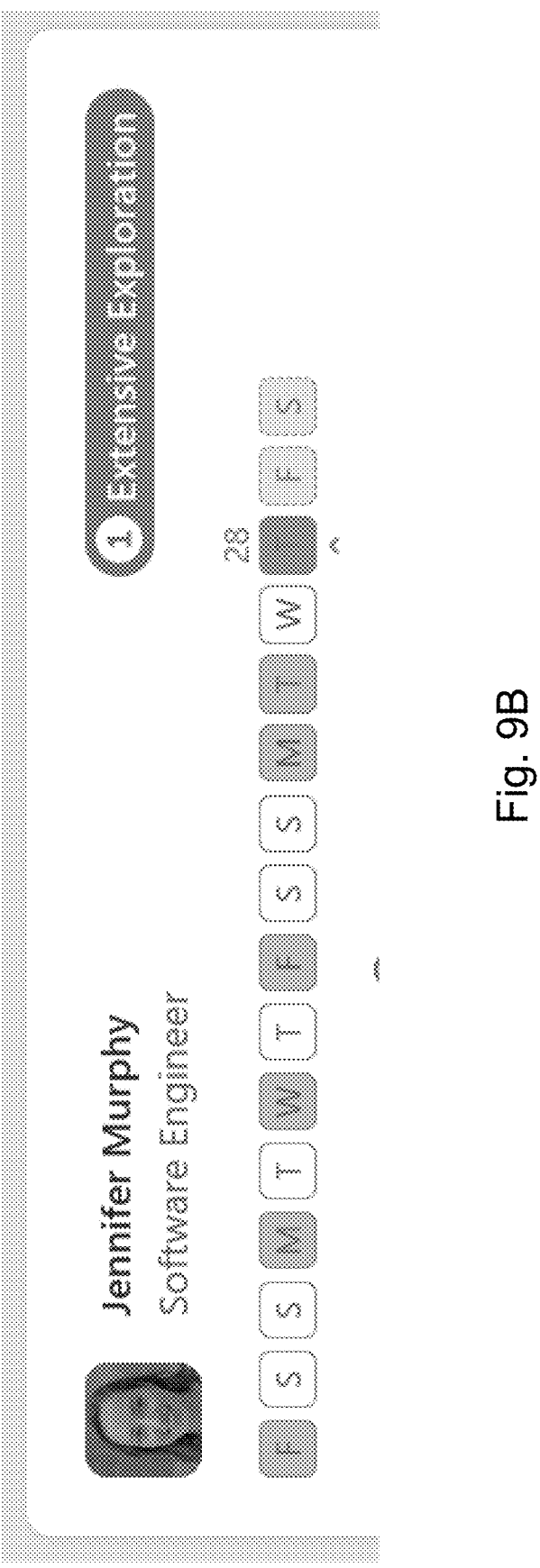
FIG. 9B presents a screenshot showing the amount of activity on a given day.

FIG. 9A shows an overview of the team from the engineering perspective. Different alerts are shown, such as Extensive Exploration and Code Churn, where oddities are detected with the active work and can escalate for visibility and prompt mitigation. FIG. 9B presents a screenshot showing the amount of activity on a given day.

Figure 10:
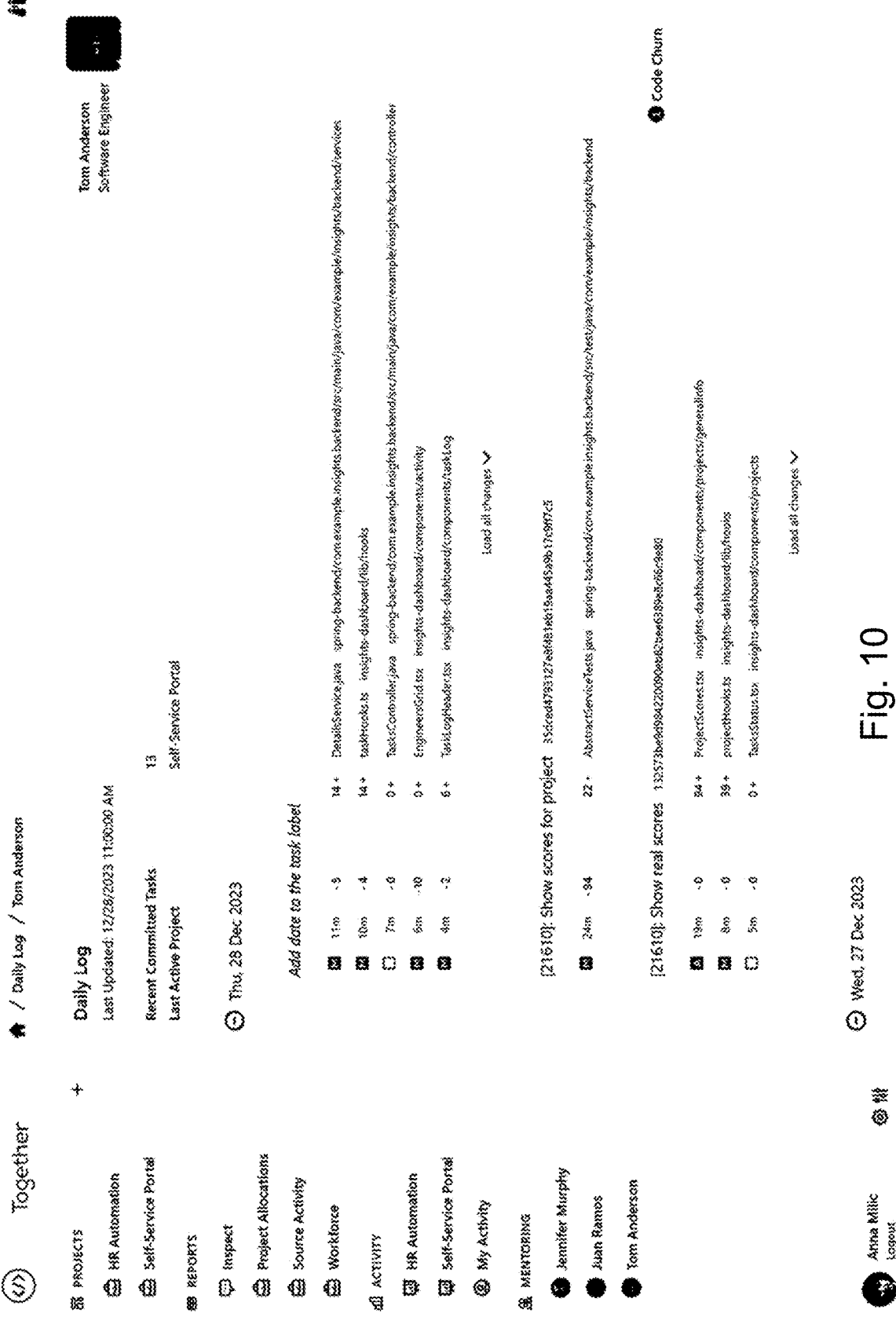
FIG. 10 shows a daily activity log which gives breakdowns in different views.

FIG. 10 shows the daily activity log, which provides breakdowns in different views. The views may be drilled in for a task showing various commits related to the task, or see all activity from a particular developer across projects. The times are used to help visualize the work by the developers.

Task Risk Calculation

The TRV is calculated by using a combination of an average of individual risk elements and the maximum value of any particular element. An example calculation of TRV is the following:

$$TRV = \max(IbC, EvS, TvS, TvE, IHC, CFI, DCR, LCR) +$$
$$avg(IbC, EvS, TvS, TvE, IHC, CFI, DCR, LCR)$$

This allows a balanced approach where any given single high risk item bumps a task's TRV to a minimum of 5 (Some values, like IHC are up to 10, and in the case of 10, TRV would be >10.) and if there are multiple risk elements about the work, it can increase approaching 10, with 10 being the highest risk change, though anything over 5 is considered a risky change and requires further investigation/analysis.

This TRV valuation is further used to calculate the Project Stability Value (PSV) based off of recent tasks completed which is then used as part of project time estimation. The PSV is calculated using the risk of recent tasks completed. As the risk approaches zero, the remaining time estimate for tasks left to be completed can be further relied upon.

Project Stability Calculation

The PSV is calculated using a sliding scale so that the tasks being completed right at the end of a development cycle have a higher impact on the PSV.

$$PSV = exponentialMovingAverage(TSV[\text{tasks}])$$

Using the exponential moving average of the tasks, a greater importance on the last tasks completed gives a better insight into the release readiness as in a healthy release cycle, the TRV of tasks completed right near the end should be much lower.

To calculate the Current Activity Level (CAL), the live developer activity is tracked using the representative elements CE, DE, TE, EE specifically filtered against work on the main work branch in revision control, or feature branches that are related to work planned for the release. The importance of this activity is greater as the code freeze point is being reached.

$$CAL = \text{sum}(\text{last3Days}(CE, DE, TE, EE))/3$$

In addition, the Average Activity Level (AAL) for the tasks on this release is also taken into account for tasks completed in the last 7 days, though the method allows different windows to be leveraged based on the length of the work cycle for the given product release.

$$AAL = \text{sum}(\text{last7Days}(CE, DE, TE, EE))/7$$

Comparing the CAL and AAL, a final Current Activity Risk (CAR) can be derived which represents the overall calculation of the active project activity relative to recent project activity.

$$CAR = \min(((CAL/AAL) - 0.5) * 5, 10)$$

Using this formula, if the current work activity is more than 50% of the recent average work activity, there is an implied risk to the release date as typically project releases have a slow down towards the end. A sustained high work activity on the main branch can be interpreted as indication that the release cycle hasn't yet come to a closing point.

Release Date Forecast

To approach the calculation of the release date, the CAR and PSV are combined to form an overall Release Confidence (RC) which is used as a multiplier against both remaining work and the regular cooldown time between code freeze and release.

Best Case Time Left (bTL)

$$bTL = \text{sum}(ETT[TasksRemaining]) + CFtR$$

Time left to when the release is projected to go out based solely on remaining work estimates.

Release confidence (RC)

$$RC = 1 + (((CAR + PSV)/20) * 2)$$

Release confidence of 1 means that the estimated time is the right time. Anything greater than 1 becomes a multiplier for the work left. In a simple example, if risk is 10 (worst case), the algorithm will triple the remaining time. The algorithm will track risk vs. actual delivery dates and over time adjust scaling factors.

Projected Time Left (wTL)

$$wTL = (bTL * RC) + ((NDT * daysLeft) * avg(ETT[RecentTasks]))$$

Adjust the best case release against release confidence, which takes into account various variables such as the excess times cards are taking, the current activity level and other factors. In addition, the projected time for release also takes into account the number of new cards added daily.

Pessimistic Time Left (pTL)

$$pTL = wRD + (wTL - bTL) - 2)$$

For the pessimistic remaining time, in a basic approach the delta between best case and projected will be doubled taking into account the unexpected risk remaining.

The technology leverages these values to provide a clear indication on a calendar and timeline to the project team showing the Optimistic Release, the Projected Release, and the Pessimistic Release dates. In addition, metrics extracted are then leveraged to provide details on the risk assessment to further visualize and help project management, such as identifying poor time estimates for work tasks as a risk cause, or that the cards have an unexpected heavy complexity for fixes and should warrant more time for release.

Adaptive & Learning Baselines

During the usage of this method, key values and metrics are adaptively refined based on the continuous updates from developers. This approach allows the system to identify the balance level for activities and identify deviations.

In addition, the method has a set of default factors that can be adjusted manually by the manager to reflect actual working habits of the team and the nature of the project itself.

Key values and metrics are adaptively refined during subsequent release. By tracking the actual release dates vs. projected dates, a scaling factor can be applied to further improve accuracy based on a given detected risk level. Certain companies will be more aggressive with changes right up to release and the algorithm can take that into account. In this example, the calculation for RC will have the "*2)" element of the formula replaced with a better scaling factor.

In addition, the method has a default set of factors that it uses to calculate risk, such as having a suitable amount of testing relative to coding. The level of work required to run tests is by default at $\frac{1}{10}$th the work of coding. By processing the average task activity, the scaling factor for normal coding vs. testing can be refined allowing better risk analysis for an average task completion for the project team. Separately, some teams may not do any unit testing in which case this aspect to the risk analysis is automatically removed.

For teams where task tracking systems do not currently have estimated time to completion included, the release forecasting is automatically adjusted to be based on the average task size automatically calculated by this method of IDE-level integration.

Finally, the adaptive nature also tracks the average number of work hours spent actively coding per day by the development team and uses that as a baseline when extracting the remaining time for the release into calendar days as a basic "8 hour workday" is not realistic in most companies and thus it is important to optimize against the real world activity of the team.

Populating Time Tracking Systems

The last and important element of this method is that it allows using the real task time to be populated into the task tracking system helping teams improve analysis from their own task platforms. The automatic collection of data using the CE, DE, EE and TE times can be summed and added to the task system. In addition, the risk analysis can be automatically included in a comment on the task if the system supports it providing greater insight for the quality assurance team responsible for verifying the functionality of the card.

Categories of aggregated data collected for a given time interval:

Browsing Time (BT)—number of time units where browsing events dominate over CT

Coding Time (CT)—number of time units where coding events dominate; takes precedence over BT Testing Time (TT)—number of time units where number of TE reached the threshold; takes precedence over CT and BT Debugging Time (DT)—number of time units where number of TE reached the threshold; takes precedence over TT, CT and BT Categories of events collected periodically (maybe move to the category above?):

File changes (FC) related to number of added/modified and removed lines for files modified during work on the current task.

Additionally, the following data is collected:

Current active task (CT) related to information about the task assigned to a given developer that is currently under active development.

Estimated Task Time (ETT) is the time the team estimated that the task would take.

Total Activity Time (TAT) captures the total active time to implement the task including BT, CT, TT and DT.

Activity Metrics

The system uses collected data to calculate the following activity metrics. Activity data is normalized for a given time period.

Coding Activity (CA)—share of CT in TAT

Exploration Activity (BA)—share of BT in TAT

Testing Activity (TA)—share of TT in TAT

Debugging Activity (DA)—share of DT in TAT

Activity Balance (AB)—level of balance between CA, BA, TA and DA.

Analysis (for each element, based on analysis of project/team, certain elements may be excluded or have lower priority—such as a team may not do much testing, or debugging)

aWC Work Complexity $$aWC = (IbCimportance(IbC) + (\dots * EtS) + \dots \text{ (sum of variables)}$$

Decreasing complexity towards release, nearing zero aDC Release Date Estimation Confidence TvE and WC should be low aWC should be nearing zero (and steady)

$$aDC = TvE + aWC$$

aRD Release Date Estimation $$RcET = \text{remaining cards' estimated time}$$

$$RcET = (\text{Sum Cards Estimate}) * TvERatio$$

$$AvCS = \text{average card size (time) in last 7 days}$$

$$RcET/CardsLeft \ (approx)$$

$$TtCD = \text{Time to Code Done} =$$

$$TtCD = RcET + (AvCS * NewDailyCards * DaysLeft)$$

The risk analysis may consider, for example, the following factors:

Time spent of active work on the task;

Number of files changed;

Number of components affected by the change;

Number of projects affected by the change;

Number of services affected by the change;

Nature of changes (different risk of added, removed and modified code); and

Result of change evolution analysis.

A Change evolution analysis is performed based on at least a periodic snapshot of list of changes (file, added/modified/removed lines). The change analysis considers the Dynamicity:

Percentage of time spent on investigation, i.e., the time from the start to a moment when are of changes stabilizes; and Percentage of time spent on implementation, i.e., the time from stabilization to end of development.

The analysis itself:

Uses information collected during work on the task;

Uses trends to identify "hard problems"; and

Calculates a risk measurement.

The results of the analysis include at least:

Build out confidence factor

Task fix complexity should reduce closing on release; and

Hard to identify tasks (lots of browsing/debugging to find fix); and

High/low estimation for release.

The change analysis uses information collected during work on the task and trends to identify "hard problems", and calculates a risk measurement. The analysis results in a build out confidence factor.

The analysis generally conclusions to be drawn, such as Change Complexity; and Simple/clean change, with characteristics which may be:

Small time to fix;

Reasonable number of edits relative to final change size (efficient);

Relatively small debug time relative to coding; or

Complex change.

The characteristics of the code changes may include:

Lots of iterations in code before settling on fix;

Lots of edits relative to final smaller change; and

Large change impacting lots of files

The technology considers indicators of code churn, and whether the code needs more stabilization. There is some difficulty in identifying changes, however, characteristics to be considered are, for example, a long exploration or debug session before coding changes. This may be an indicator of more obscure issues lingering, may need more testing.

The algorithm considers Task-Centric Variables, such as:

IbC=relative time activating exploring/debugging before proper coding, e.g.,

10=5× time investigating to coding

1=2× time investigating to coding

0=1× time investigating to coding

EtS=number of edits compared to characters in change set, e.g.,

10=10,000 keystrokes but only 500 characters in change

1=1,000 keystrokes for 500 characters

0=500 keystrokes for 500 characters

TvC=time doing tests during coding (if a team/project doesn't have much test time run on it, we don't use test as an important part of ratio)

TvE=time estimated for task compared to actual time doing task, e.g.,

0=same or less time than estimated

1=1.5× from estimate

10=3× from estimate

Figure 12:
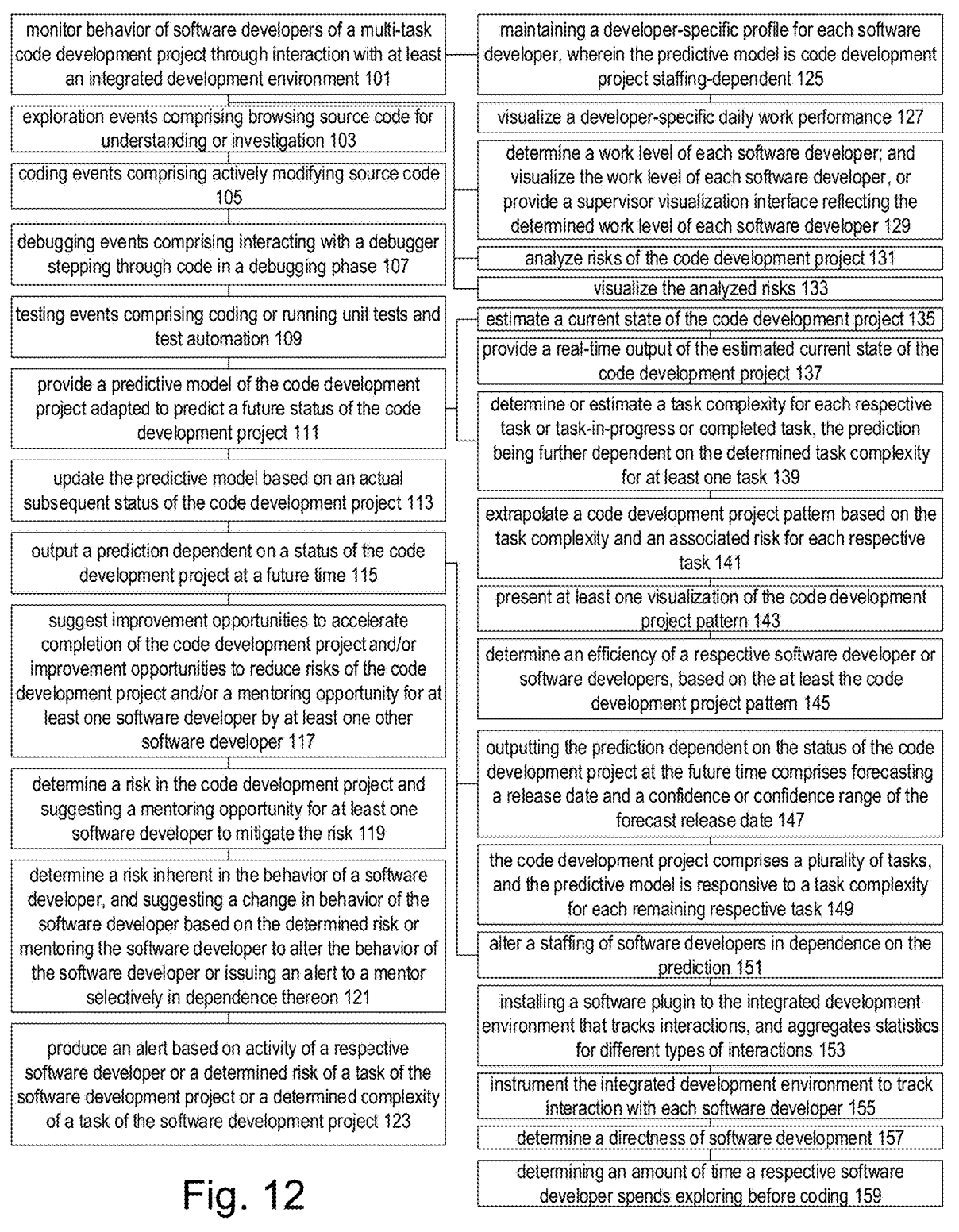

CiHF=change to files that have high frequency churn rate
(track files that have the most frequent changes to
them), e.g.,
    based on files reported being modified
CiCF=change to common functions, e.g.,
    based on language services (find references)
DiC=dependency impacting change (add new modules,
versions etc.), e.g.,
    importance increases later in release cycle
        early in cycle, low impact to risk
        late in cycle, high impact
HcS=total human change size
    total human-inputted changes from keystrokes
The algorithm also considered Pipeline-Centric Variables,
e.g.,
    TC=task churn (addition and removal of card rate)
The technology therefore uses real-time activity monitor-
ing in developer IDEs to improve task time estimation, such
as:
    Connecting to task tracking system (JIRA, Kanban) auto-
        matically track and leverage active tasks by developer
    Using active Git repository, automatically track developer
        activity in the IDE to update tasks
    Use IDE extensibility to introduce real-time monitoring of
        the work activities
    Net result to improve future planning of tasks by using
        more accurate data
The technology also uses real-time activity monitoring in
developer IDEs to augment software release forecasting.
Forecasting traditionally involves the number of tasks
remaining with work estimation. The present technology
uses IDE extensibility to introduce real-time monitoring of
the work activities, and uses activity levels on the "main
branch". Factors that can be used during risk analysis
include:
    Time spent of active work on the task
    Number of files changed
    Number of components affected by the change
    Number of projects affected by the change
    Number of services affected by the change
    Nature of changes (different risk of added, removed and
        modified code)
    Result of change evolution analysis
FIG. 12 shows a first embodiment of the method. A
method is provided for predicting progress of a code devel-
opment project. Behavior of a plurality of software devel-
opers is monitored through interaction with at least an
integrated development environment 101. The interaction
comprises:
    exploration events comprising browsing source code for
        understanding or investigation 103;
    coding events comprising actively modifying source code
        105;
    debugging events comprising interacting with a debugger
        stepping through code in a debugging phase 107; and
    testing events comprising coding or running unit tests and
        test automation 109.
A predictive model of the code development project
adapted to predict a future status of the code development
project is provided 111. A prediction dependent on a status
of the code development project at a future time is output.
115
The method may further comprise updating the predictive
model based on an actual subsequent status of the code
development project 113.

A developer-specific profile may be maintained for each
software developer, wherein the predictive model is code
development project staffing-dependent 125. A developer-
specific daily work performance may be visualized 127.
The method may further comprise determining a work
level of each software developer; and visualizing the work
level of each software developer 129.
The method may further comprise determining a work
level of each software developer; and providing a supervisor
visualization interface reflecting the determined work level
of each software developer.
The method may further comprise analyzing risks of the
code development project 131.
The method may further comprise visualizing the ana-
lyzed risks 133.
The method may further comprise suggesting improve-
ment opportunities to accelerate completion of the code
development project 117.
The method may further comprise suggesting improve-
ment opportunities to reduce risks of the code development
project.
The method may further comprise suggesting a mentoring
opportunity for at least one software developer by at least
one other software developer.
The method may further comprise determining a risk in
the code development project and suggesting a mentoring
opportunity for at least one software developer to mitigate
the risk 119.
The method may further comprise determining a risk
inherent in the behavior of a software developer, and sug-
gesting a change in behavior of the software developer based
on the determined risk 121.
The method may further comprise determining a risk
inherent in the behavior of a software developer, and men-
toring the software developer to alter the behavior of the
software developer.
The method may further comprise determining a risk
inherent in the behavior of a software developer, and issuing
an alert to a mentor selectively in dependence thereon 123.
The method may further comprise estimating a current
state of the code development project 135.
The method may further comprise providing a real-time
output of the estimated current state of the code develop-
ment project 137.
The code development project may comprise a plurality
of tasks.
The method may further comprise determining a task
complexity for each respective task, wherein the prediction
is further dependent on the determined task complexity for
at least one task 139.
The method may further comprise determining a task
complexity for a task-in-progress, wherein the prediction is
further dependent on the determined task complexity.
The method may further comprise estimating a task
complexity for each respective task.
The method may further comprise determining a task
complexity for at least one completed task, wherein the
prediction is further dependent on the determined task
complexity.
The method may further comprise extrapolating a code
development project pattern based on the task complexity
and an associated risk for each respective task 141.
The method may further comprise presenting at least one
visualization of the code development project pattern 143.
The method may further comprise determining an effi-
ciency of a respective software developer based on the at
least the code development project pattern 145.

The method may further comprise determining an efficiency of the plurality of software developers based on the at least the code development project pattern.

The outputting the prediction dependent on the status of the code development project at the future time may comprise forecasting a release date 147.

The method may further comprise determining a confidence of the forecast release date.

The method may further comprise determining a confidence range of the forecast release date.

The code development project may comprise a plurality of tasks, wherein the predictive model is responsive to a task complexity for each remaining respective task 149.

The method may further comprise altering a staffing of software developers in dependence on the prediction 151.

The method may further comprise producing an alert based on activity of a respective software developer.

The method may further comprise producing an alert based on a determined risk of a task of the software development project.

The method may further comprise producing an alert based on a determined complexity of a task of the software development project.

The method may further comprise altering a staffing of software developers on the code development project in dependence on the prediction.

The monitoring behavior of the plurality of software developers through interaction with at least the integrated development environment may comprise installing a software plugin to the integrated development environment that tracks interactions, and aggregates statistics for different types of interactions 153.

The monitoring behavior of the plurality of software developers through interaction with at least the integrated development environment may comprise instrumenting the integrated development environment to track interaction with each software developer 155.

The monitoring behavior of the plurality of software developers through interaction with at least the integrated development environment may comprise tracking interaction with each software developer.

The monitoring behavior of the plurality of software developers through interaction with at least the integrated development environment comprises determining a directness of software development 157.

The monitoring behavior of the plurality of software developers through interaction with at least the integrated development environment may comprise determining an amount of time a respective software developer spends exploring before coding 159.

The monitoring behavior of the plurality of software developers through interaction with at least the integrated development environment may comprise determining a churn rate on code that gets committed.

The monitoring behavior of the plurality of software developers through interaction with at least the integrated development environment comprises determining a size of a code change set produced by a respective software developer.

The monitoring behavior of the plurality of software developers through interaction with at least the integrated development environment may comprise determining code iterations during a task of the code development project.

The monitoring behavior of the plurality of software developers through interaction with at least the integrated development environment may comprise determining debug/code cycles during a task of the code development project.

The code development project may comprise a plurality of tasks, wherein the monitoring behavior of the plurality of software developers through interaction with at least the integrated development environment comprises determining a proportional time in a testing cycle of a respective task having a change size relative to other tasks with similar change size.

The monitoring behavior of the plurality of software developers through interaction with at least the integrated development environment may comprise determining a quantity of a change to at least one dependency with respect to predicted time before release of the code development project.

The monitoring behavior of the plurality of software developers through interaction with at least the integrated development environment, may comprise monitoring coding events related to keystrokes in project source code files.

The monitoring behavior of the plurality of software developers through interaction with at least the integrated development environment, may comprise monitoring debugging events related to using breakpoints, stepping through code, and actions related to diagnosing a behavior of code.

The monitoring behavior of the plurality of software developers through interaction with at least the integrated development environment, may comprise monitoring exploration events related to scrolling through different source code files.

The monitoring behavior of the plurality of software developers through interaction with at least the integrated development environment, may comprise monitoring exploration events distinct from coding events, testing events, and debugging events.

The monitoring behavior of the plurality of software developers through interaction with at least the integrated development environment, may comprise monitoring exploration events and debugging events prior to commencing coding.

The monitoring behavior of the plurality of software developers through interaction with at least the integrated development environment, may comprise monitoring exploration events and debugging events prior to commencing coding.

Figure 11:
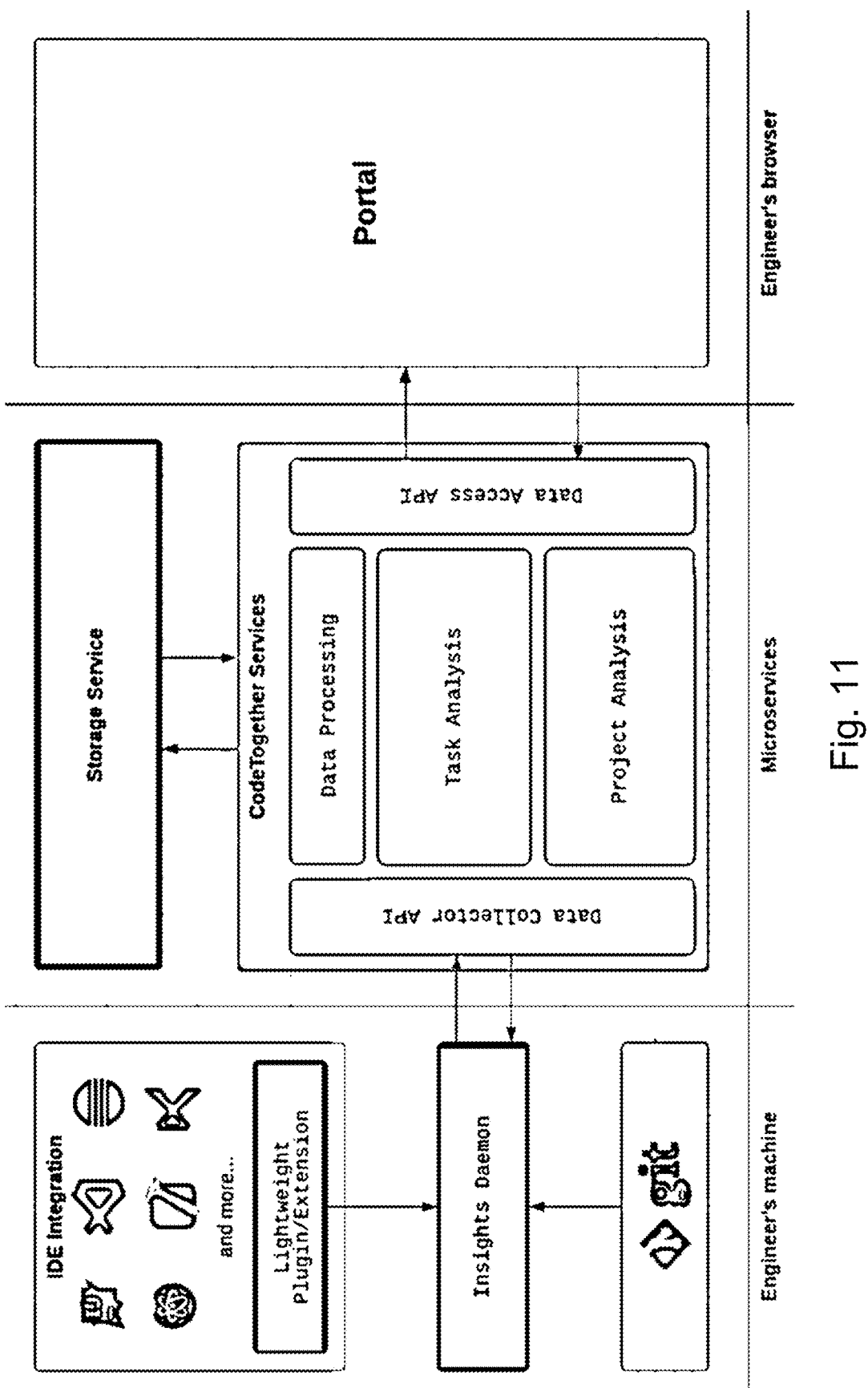
FIG. 11 shows a block diagram of a system in accordance with a first embodiment of the invention.

FIG. 13 shows a second embodiment of the method, similar to the first embodiment described with respect to FIG. 11. A method is provided for predicting progress of a code development project. Behavior of a plurality of software developers is monitored through interaction with at least an integrated development environment 201. The interaction comprises:

exploration events comprising browsing source code for understanding or investigation 203;

coding events comprising actively modifying source code 205;

debugging events comprising interacting with a debugger stepping through code in a debugging phase 107; and testing events comprising coding or running unit tests and test automation 209.

A predictive model of the code development project adapted to predict a future status of the code development project is provided 211. The predictive model may be updated based on an actual subsequent status of the code development project 213. A prediction dependent on a status of the code development project at a future time is output 215.

The monitoring behavior of the plurality of software developers through interaction with at least the integrated development environment, comprises 217:

determining a proportional time in a testing cycle of a respective task having a change size relative to other tasks with similar change size;

determining a quantity of a change to at least one dependency with respect to predicted time before release of the code development project; monitoring coding events related to keystrokes in project source code files;

monitoring debugging events related to using breakpoints, stepping through code, and actions related to diagnosing a behavior of code;

monitoring exploration events related to scrolling through different source code files; and monitoring exploration events distinct from coding events, testing events, and debugging events.

The code development project comprises a plurality of tasks. The method may further comprise building a risk assessment for respective tasks based on tracking of task assignments to respective software developers and active task development by respective software developers 219.

The code development project may comprise a plurality of tasks. the prediction may comprise an aggregate of an estimated task time for each respective task 221. The coding events may comprise impacted common functions which capture a number of references to changed functions in the source code modified as part of a respective task 223. the coding events may comprise a determination of a dependency impact which captures a number of dependency changes introduced by implementation of a respective task 225.

The method may further comprise automatically populating an engineering time in a task tracking system 227.

The coding events may comprise a change size which captures a complexity of a final implementation of a respective software developer task based on characteristics of code impacted 229.

The monitoring may comprise determining a file churn index representing a frequency of change to files in a source code repository relative to other files in the source code repository 231.

The method may further comprise determining a safety or risk of a change to the source code 233.

The safety is determined based on at least a number of coding events, an impact on source code dependencies, and amount of at least one of exploration events and debugging events prior to commencement of a coding event, an amount of testing events with respect to a change size 235.

The risk may be determined based on at least a size of a code change with respect to a predicted code freeze, an amount or duration of exploration events, a sufficiency of testing events with respect to a size of a code change, and an amount of code churn 237. the coding events, exploration events, debugging events, and testing events may be automatically distinguished 239.

The prediction may be dependent on at least a concurrent second code development project 241.

FIG. 14 shows a third embodiment of a method for monitoring progress of a code development project. The code development project comprises at least one task 301. Real time data from an integrated development environment is provided for a plurality of software developers 303. Exploration events comprising browsing source code for understanding or investigation 305, coding events comprising actively modifying source code 307, debugging events comprising interacting with a debugger stepping through code in a debugging phase 309, and testing events comprising coding or running unit tests and test automation are determined 311. The exploration events, coding events, debugging events, and testing events are analyzed to determine a current status of the code development project 313. The time to task completion is estimated within the code development project 315.

The integrated development environment is interfaced with a task tracking system 317.

The task tracking system may be e.g., Jira Kanban, Scrum, Trello, Quire, WorkFlowy, Asana, Wekan, or other task tracking system 319.

Real time data from an active code repository is provided, and the providing real time data from an integrated development environment comprises automatically tracking developer activity in the integrated development environment to update the at least one task 321.

The method may further provide an application which interfaces with the integrated development environment using an application programming interface to provide real-time monitoring of the plurality of software developers 323.

FIG. 15 shows a fourth embodiment of a method for predicting readiness for release of a code development project 401. Behavior of a plurality of software developers is monitored through interaction with at least an integrated development environment 403.

The interaction comprises:

exploration events comprising browsing source code for understanding or investigation 405;

coding events comprising actively modifying source code 407;

debugging events comprising interacting with a debugger stepping through code in a debugging phase 409; and testing events comprising coding or running unit tests and test automation 411;

determining a progress of the code development project toward release 413.

A prediction of a time of readiness of the code development project for release dependent on the progress and the monitored behavior is output 415.

A main branch of the code development project and at least one ancillary branch of the code development project is determined. The prediction of the time for readiness is principally weighted based on tasks within the main branch 417.

The monitoring is responsive to at least 419:

a time spent of active work on a respective task;

a number of file changes;

a number of components affected by the file changes;

a number of projects affected by the software changes;

a number of services affected by the software changes;

a nature of changes with respect to at least added code, removed code, and modified code; and a result of change evolution analysis.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

The article "a" encompasses one or more of the succeeding object.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for monitoring a code development project, comprising:

automatically monitoring at least one sequence of actions by at least one code developer during the code development project through installing a software plugin to at least one integrated code development environment;

using the software plugin to automatically distinguish between coding events, exploration events, debugging events, and testing events associated with each respective code developer within the code development environment, by at least capturing keystrokes in code and diagnosing a code behavior using breakpoints and stepping through the code;

obtaining an amount of time consumed by each of the at least one code developer on each of the at least one sequence of actions, through interaction with the at least one integrated code development environment;

predictively modeling the code development project and the code developer, using an automated adaptive predictive model dependent on a project timeline initially determined by an external computer system and a set of prior monitored sequence of actions with respect to the monitored time, the-code developer, code development project phases, and code development project risks;

updating the automated adaptive predictive model with at least one automated processor to reduce a prediction error of at least one of prediction associated with respective code developer activity, code developer productivity with respect to the monitored time, code development project progress, and code development project risks, the prediction including an actual engineering time taken to complete the code development project, and transmitting structured data including the actual engineering time through an application programming interface to configure processing parameters of the external computer system and to dynamically adjust subsequent project timelines using an artificial intelligence (AI) algorithm.

2. The method according to claim 1, wherein the predictive modelling is of the at least one code developer, wherein a separate profile is maintained for each respective code developer.

3. The method according to claim 1, wherein the at least one sequence of actions comprises one or more of a coding action, an exploration activity, a testing action, a debugging action, or an analysis action, wherein the analysis action comprises at least one of an excluding action or a priority adjustment action.

4. The method according to claim 1, wherein the code development project employs a plurality of code developers and the predictive modelling is of both the plurality of code developers and the code development project, the method further comprising using the automated adaptive predictive model to optimize staffing of the code development project by a subset of the plurality of code developers to achieve a cost-efficient completion of the code development project.

5. The method according to claim 1, wherein the exploration events comprise browsing for understanding or investigation without actively advancing the code development, and the coding events comprise actively advancing the code development.

6. The method according to claim 1, wherein the debugging events comprise inspecting code execution states, and the testing events comprise coding or running unit tests and test automation.

7. The method according to claim 1, wherein the automated adaptive predictive model is further updated to reduce an error in predicting a slippage of at least one release.

8. The method according to claim 1, further comprising determining a time and resource cost function, and outputting at least one proposal for at least one of cost efficiently increasing a speed of completion of the code development project and decreasing a risk of the code development project.

9. The method according to claim 1, further comprising determining a risk in the code development project and producing an output comprising a suggested mentoring opportunity for at least one code developer to mentor at least one other code developer to mitigate a code development project risk.

10. The method according to claim 1, further comprising determining a risk inherent in a behavior of at least one code developer, and producing an automated output suggesting mentoring of the at least one code developer to alter a behavior of the at least one code developer dependent on differences between past behavior of the at least one code developer and other code developers.

11. The method according to claim 1, wherein the code development project comprises a plurality of tasks, each respective task having a task complexity, and the automated adaptive predictive model is further dependent on the task complexity of the plurality of tasks, further comprising predicting a progress of the code development project using the automated predictive model dependent on a complexity of incomplete tasks.

12. The method according to claim 1, wherein the software plugin tracks interactions and aggregates statistics for different types of interactions.

13. The method according to claim 1, wherein the at least one code developer comprises a plurality of code developers, and the code development project comprises a plurality of tasks, the method further comprising building a risk assessment for respective tasks based on tracking of task assignments to respective code developers and active task development by respective code developers.

14. The method according to claim 1, wherein the code development project comprises a plurality of tasks having dependencies, the method further comprising determining a dependency impact which captures a number of dependency changes introduced by implementation of a respective task.

15. The method according to claim 1, wherein the coding events comprise a change size that captures complexity of an implementation of a respective code developer task based on characters of code impacted.

16. The method according to claim 1, wherein the automatically monitoring of the at least one sequence of actions by at least one code developer during the code development project comprises determining a file churn index representing a frequency of change to files in a source code repository relative to other files in the source code repository.

17. The method according to claim 1, further comprising determining a risk of a change to source code within the code development project.

18. The method according to claim 17, wherein the risk is determined based on at least a size of a code change with respect to a predicted code freeze, an amount or duration of exploration events, a ratio or time of different types of development activities, a sufficiency of testing events with respect to a size of a code change, and an amount of code churn.

19. The method according to claim 1, wherein the automatic monitoring is responsive to at least:
a time spent of active work by a code developer on a respective task;
a number of file changes;
a number of components affected by the file changes;
a number of projects affected by software changes;
a number of services affected by the software changes;
a nature of changes with respect to at least added code, removed code, and modified code; and
a result of change evolution analysis.

\* \* \* \* \*